(12) United States Patent
Sugahara

(10) Patent No.: US 8,172,389 B2
(45) Date of Patent: May 8, 2012

(54) FILTER, LIQUID JETTING APPARATUS, AND LIQUID TRANSPORTING APPARATUS

(75) Inventor: Hiroto Sugahara, Aichi-ken (JP)

(73) Assignee: Brother Kogyo Kabushiki Kaisha, Nagoya-Shi, Aichi-ken (JP)

( * ) Notice: Subject to any disclaimer, the term of this patent is extended or adjusted under 35 U.S.C. 154(b) by 945 days.

(21) Appl. No.: 12/022,743

(22) Filed: Jan. 30, 2008

(65) Prior Publication Data
US 2008/0180500 A1 Jul. 31, 2008

(30) Foreign Application Priority Data

Jan. 30, 2007 (JP) ................................. 2007-019191

(51) Int. Cl.
B41J 29/38 (2006.01)
B41J 2/175 (2006.01)

(52) U.S. Cl. ................... 347/93; 347/5; 347/6

(58) Field of Classification Search ............ 347/93, 347/92, 70, 86
See application file for complete search history.

(56) References Cited

U.S. PATENT DOCUMENTS

| 4,904,394 | A * | 2/1990 | Clarke et al. ............... 210/739 |
| 6,299,285 | B1 | 10/2001 | Inui |
| 6,672,704 | B2 | 1/2004 | Katakura et al. |
| 7,490,405 | B2 * | 2/2009 | Sanada .................... 29/890.1 |
| 2004/0001123 | A1 * | 1/2004 | Yamaguchi ................ 347/70 |
| 2006/0236536 | A1 | 10/2006 | Saito et al. |
| 2007/0002108 | A1 * | 1/2007 | Sugahara .................... 347/92 |

FOREIGN PATENT DOCUMENTS

| JP | H10-226057 A | 8/1988 |
| JP | S63-260456 A | 10/1988 |
| JP | H5-131645 A | 5/1993 |
| JP | 2001-105620 A | 4/2001 |
| JP | 2002361908 A | 12/2002 |
| JP | 2003-072104 A | 3/2003 |
| JP | 2006168141 A | 6/2006 |
| JP | 2006-272806 A | 10/2006 |
| JP | 2007-013009 A | 1/2007 |

OTHER PUBLICATIONS

Japan Patent Office, Notice of Reasons for Rejection for Japanese Patent Application No. 2007-019191 (counterpart to above-captioned patent application), mailed Jun. 14, 2011.
Japan Patent Office, Notice of Decision of Refusal for Japanese Patent Application No. 2007-019191 (counterpart to above-captioned patent application), mailed Feb. 14, 2012.

* cited by examiner

Primary Examiner — Matthew Luu
Assistant Examiner — Renee I Wilson
(74) Attorney, Agent, or Firm — Baker Botts L.L.P.

(57) ABSTRACT

A filter includes a filter plate provided with a through holes formation portion in which a plurality of through holes is formed, a ring-shaped piezoelectric layer arrangement portion on an upper surface of which a piezoelectric layer is formed, and a circular-shaped fixed portion fixed to a tube, an electrode formed almost on an entire area on an upper surface of the piezoelectric layer, and a protective layer covering the piezoelectric layer and the electrode. When a driving electric potential is applied to the electrode, an electric field is generated in the piezoelectric layer, and the piezoelectric layer is contracted to deform the filter plate. With the deformation of the filter plate, the filter vibrates, and it is possible to release impurities and air bubbles in a liquid trapped in the filter. Accordingly, it is possible to realize a long life of the filter.

15 Claims, 18 Drawing Sheets

FILTER, LIQUID JETTING APPARATUS, AND LIQUID TRANSPORTING APPARATUS

CROSS-REFERENCE TO RELATED APPLICATION

The present application claims priority from Japanese Patent Application No. 2007-019191, filed on Jan. 30, 2007, the disclosure of which is incorporated herein by reference in its entirety.

BACKGROUND OF THE INVENTION

1. Field of the Invention

The present invention relates to a filter which traps impurities and air bubbles in a liquid, and a liquid jetting apparatus and a liquid transporting apparatus in which such filter is provided.

2. Description of the Related Art

In the liquid jetting apparatuses which jet a liquid from nozzles, there are liquid jetting apparatuses which remove air bubbles and a thickened liquid inside a liquid jetting head by carrying out a purge in which a liquid inside the liquid jetting head is sucked from the nozzle. For example, in an ink-jet printer described in Japanese Patent Application Laid-open No. 2002-361908, a cleaning operation is carried out. In the cleaning operation, a nozzle surface in which jetting ports of nozzles are formed is sealed by a cap member, and after supplying an ink into a sealed portion, a purge operation of sucking out air bubbles, thickened ink, impurities, or the like inside a recording head is carried out by operating a suction pump.

Moreover, in the liquid jetting apparatuses which jet a liquid from nozzles and liquid transporting apparatuses which transport a liquid, there are apparatuses in which a filter is provided for removing air bubbles and impurities in the liquid inside a liquid channel. For example, in an ink-jet recording head described in Japanese Patent Application Laid-open No. 2006-168141, a filter is formed as a plurality of through holes formed by an etching in an Si substrate which forms ink channels, and impurities such as thickened and solidified ink are trapped by these through holes.

SUMMARY OF THE INVENTION

Here, in a liquid jetting apparatus in which the filter as described in Japanese Patent Application Laid-open No. 2006-168141 is arranged in a liquid channel, even when the purge operation as described in Japanese Patent Application Laid-open No. 2002-361908 is carried out for trapping air bubbles in the liquid by the through holes of the filter, it is not possible to remove sufficiently the air bubbles stuck to the through holes, and due to blocking of the through holes by the air bubbles, a life of the filter becomes short.

An object of the present invention is to provide a filter, which is capable of trapping impurities and air bubbles in the liquid and removing the bubbles trapped, and a liquid jetting apparatus and a liquid transporting apparatus which include such filter.

According to a first aspect of the present invention, there is provided a filter which is arranged in a liquid channel through which a liquid flows, comprising:

a filter plate in which a plurality of through holes communicating with the liquid channel is formed; and a piezoelectric actuator which vibrates the filter plate, and which has a piezoelectric layer formed on a surface of the filter plate, and an electrode provided on a surface of the piezoelectric layer.

Accordingly, when the liquid, which flows through the liquid channel passes through the through holes, air bubbles and impurities, which cannot pass through the through holes, are trapped in the through holes. Moreover, by making the filter plate vibrate by the piezoelectric actuator, since the air bubbles and the impurities adhered to the through holes are separated from the through holes, a blocking of the through holes due to the air bubbles is eliminated, and a life of the filter becomes long.

In the filter of the present invention, the filter plate may have a ring-shaped fixed portion which is fixed to a wall defining the liquid channel; a first area surrounded by the fixed portion; a through holes-formation portion in which the through holes are formed; and a piezoelectric layer-arrangement portion on which the piezoelectric layer is arranged, and the through holes-formation portion and the piezoelectric layer-arrangement portion may be provided in the first area of the filter plate such that these portions do not overlap mutually. Accordingly, sine the through holes are formed in the portion of the filter plate, surrounded by the fixed portion, and also the piezoelectric layer is formed on the surface of the portion of the filter plate, surrounded by the fixed portion, when the piezoelectric actuator is driven, a portion of the filter plate in which the through holes are formed is susceptible to vibrate, and the air bubbles adhered to the through hole are separated assuredly from the through hole. The words "the through holes-formation portion and the piezoelectric layer-arrangement portion are provided such that the through holes formation portion and the piezoelectric layer-arrangement portion do not overlap mutually" means an area occupied by the through holes formation portion and another area occupied by the piezoelectric layer-arrangement portion does not overlap mutually in the filter plate.

In the filter of the present invention, the through holes-formation portion may be provided substantially at a center of the first area, and the piezoelectric layer-arrangement portion may be provided to surround the through holes-formation portion. Accordingly, since the piezoelectric layer is provided on an outer side of the portion surrounded by the fixed portion, it is possible to form easily a wire (wiring) which is connected to the electrode arranged on the surface of the piezoelectric layer, and which applies an electric potential to the electrode.

In the filter of the present invention, the through holes-formation portion may be provided on an outer portion of the first area, and the piezoelectric layer-arrangement portion may be provided at an inner portion, of the filter plate, located with respect to the through holes-formation portion. In the liquid channel, generally, a flow speed of a liquid on an outer peripheral (circumferential) portion is slower than a flow speed of a liquid on a central portion, and an air bubble is susceptible to be accumulated in the outer peripheral portion, and accordingly, since the through holes are formed along an outer periphery (circumference) of an area surrounded by the fixed portion, it is possible to trap efficiently the bubbles in the liquid channel.

In the filter of the present invention, a protective film which covers the piezoelectric layer and the electrode may be provided on one surface of the filter plate. Accordingly, it is possible to prevent the piezoelectric actuator from making a contact with the liquid, by the protective film.

In the filter of the present invention, the protective film may cover the piezoelectric actuator and an adjacent portion, of a certain member, adjacent to the piezoelectric actuator, the member being arranged adjacent to the piezoelectric actuator. Accordingly, it is possible to prevent the liquid from entering through a gap between the piezoelectric actuator and a member adjacent to the piezoelectric actuator, and to prevent the piezoelectric actuator from making a contact with the liquid due to entering.

In the filter of the present invention, an adjacent portion, of a side surface of the piezoelectric layer, adjacent to the through holes-formation portion may be progressively inclined to be nearer to the through holes-formation portion toward the one surface of the filter plate. Accordingly, since the side surface of the piezoelectric layer is inclined, the air bubbles are hardly accumulated near the side surface of the piezoelectric layer of the liquid channel.

In the filter of the present invention, the filter plate may be extended up to a portion outside of the liquid channels upon beyond a wall which defines the liquid channel, and may be deformably supported by the wall defining the liquid channel; and the piezoelectric layer may be arranged on an area of the filter plate, the area being outside of the wall defining the liquid channel. Accordingly, since the piezoelectric actuator is arranged on the outer portion of the liquid channel, the liquid inside the liquid channel is prevented from making a contact with the piezoelectric actuator.

In the filter of the present invention, the electrode may be provided on a surface of the piezoelectric layer, on a side not facing the filter plate; the filter plate may be made of an electroconductive material; and an electric field may be applied, by the electrode and the filter plate, to a portion of the piezoelectric layer sandwiched between the electrode and the filter plate. Accordingly, since it is possible to use the filter plate also as one electrode for driving the piezoelectric layer, it is possible to lower a cost of the filter.

In the filter of the present invention, the through holes formed in the filter plate may be formed to be tapered from the one surface of the filter plate toward another surface of the filter plate opposite to the one surface. In this case, since a wide opening is formed toward an upstream side of the channel, a resistance of the liquid is reduced, and it is possible to trap assuredly the air bubbles and impurities.

According to a second aspect of the present invention, there is provided a liquid jetting apparatus which jets a liquid, including:

a filter as defined in the present invention;

a liquid channel in which the filter is arranged;

a liquid jetting head which has a nozzle communicating with the liquid channel and which jets the liquid from the nozzle;

a liquid discharge mechanism which discharges the liquid inside the liquid channel and the liquid jetting head through the nozzle; and a controller which controls an operation of the piezoelectric actuator and the liquid discharge mechanism, and when the liquid discharge mechanism discharges the liquid inside the channel unit through the nozzle, the controller controls the piezoelectric actuator and the liquid discharge mechanism such that the piezoelectric actuator vibrates the filter plate.

Accordingly, at the time of discharging the liquid inside the liquid jetting head and the liquid channel from the nozzle by the liquid discharge mechanism, by causing to vibrate the portion of the vibration plate in which the through holes are formed, since the air bubbles adhered to the through holes are separated from the through holes, it is possible to remove efficiently the air bubbles adhered to the through holes.

In the liquid jetting apparatus of the present invention, the controller may make the liquid discharge mechanism discharge the liquid inside the channel unit, and at the same time, may make the piezoelectric actuator to vibrate the filter plate;

and a time during which the controller makes the piezoelectric actuator to vibrate the filter plate may not be more than half of a time during which the controller makes the liquid discharge mechanism discharge the liquid. In this case, since there is a sufficient time of making discharge the liquid after the filter plate has stopped vibrating, it is possible to discharge the air bubbles, which have come off from the filter plate due to the vibration of the filter plate, without being trapped again in the filter.

In the liquid jetting apparatus of the present invention, the controller may make the piezoelectric actuator to vibrate the filter plate at a frequency in a range of 20 Hz to 30 Hz. By causing the filter plate to vibrate at a frequency in the range of 20 Hz and 30 Hz, it is possible to separate assuredly the air bubbles etc. trapped in the filter.

According to a third aspect of the present invention, there is provided a liquid transporting apparatus including:

a channel unit which has a plurality of pressure chambers opening in one surface, and a common liquid chamber opening in the one surface and communicating with the pressure chambers;

a vibration plate which covers an opening of the common liquid chamber, which is arranged on the one surface of the channel unit, and which has a plurality of pressure chamber-closing portions covering the pressure chambers and a filter portion in which a plurality of through holes is formed;

a plurality of first piezoelectric elements each of which is formed on a surface of one of the pressure chamber-closing portions, on a side not facing the channel unit;

a first driving electrode which is used for driving the first piezoelectric elements;

a second piezoelectric element which is formed in the vicinity of the filter portion, on a surface of the vibration plate, on a side not facing the channel unit;

a second driving electrode which is used for driving the second piezoelectric element; and a piezoelectric layer which is formed, on the surface of the vibration plate, on a side not facing the channel unit, across at an area facing the pressure chamber-closing portions and the filter portion, and which constructs the first piezoelectric elements and the second piezoelectric element, and the first driving electrodes and the second driving electrode are formed on a same surface of the piezoelectric layer.

Accordingly, by applying the driving electric potential to the first driving electrodes, it is possible to transport the liquid inside the pressure chamber by applying a pressure to the liquid inside the pressure chamber by making deform the pressure chamber blocking portions of the vibration plate. Moreover, by causing the filter portion of the vibration plate to vibrate by applying the driving electric potential to the second driving electrode, since the air bubbles adhered to the through holes are separated from the through holes, it is possible to eliminate the blocking due to the air bubbles in the through holes, and a life of the filter becomes long.

Furthermore, by arranging the vibration plate on the surface of the channel unit, it is possible to deform the pressure chamber blocking portion and the filter portion simultaneously, and by forming the piezoelectric layer on the surface of the vibration plate, it is possible to form the first piezoelectric elements and the second piezoelectric element simultaneously, and since the first driving electrode and the second driving electrode are formed on the same surface of the piezoelectric layer, it is possible to form the first driving electrode and the second driving electrode simultaneously. Accordingly, a manufacturing of the liquid transporting apparatus is simplified.

According to a forth aspect of the present invention, there is provided a liquid transporting apparatus which transports the liquid including:
a filter as defined in the present invention;
a liquid channel in which the filter is arranged;
a flow-generator which generates a flow of the liquid in the liquid channel; and
a controller which controls an operation of the piezoelectric actuator and the flow-generator,
and when the controller controls the piezoelectric actuator to vibrate the filter plate, the controller controls the flow-generator to generate the flow of the liquid in the liquid channel.

In the liquid transporting apparatus of the present invention, since the transporting apparatus includes the filter as defined in the present invention, air bubbles in the liquid in the liquid channel can be removed assuredly. In addition, air bubbles trapped in the filter also can be removed easily by vibrating the filter. The flow-generator may be arbitrary mechanism as long as the mechanism can generate a flow in the liquid. For example, a pump, a screw propeller can be used as the flow-generator.

DETAILED DESCRIPTION OF THE PREFERRED EMBODIMENTS

Exemplary embodiment and modified embodiments of the present invention will be described below. The embodiment is an example in which the present invention is applied to an ink-jet printer which jets ink from nozzles.

Figure 1:
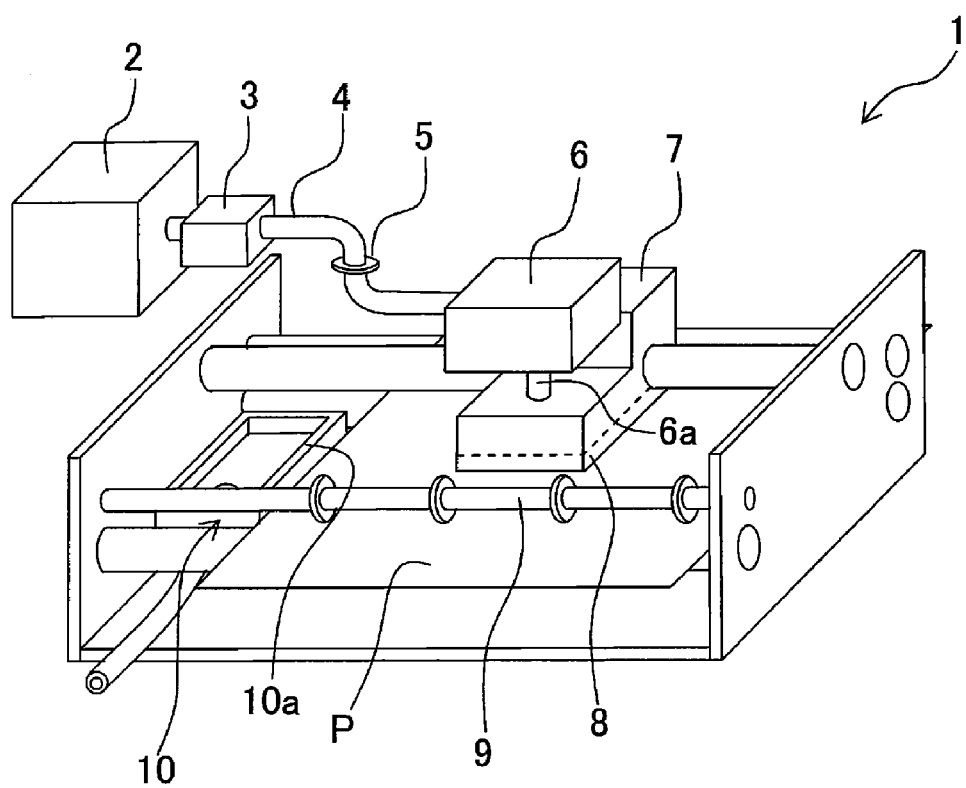
FIG. 1 is a schematic structural view of a printer according to an embodiment of the present invention.

FIG. 1 is a schematic structural view of an ink-jet printer according to the embodiment. As shown in FIG. 1, an ink-jet printer 1 (liquid jetting apparatus, liquid transporting apparatus) includes an ink tank 2, a pump 3, a tube 4, a filter 5, a sub tank 6, a carriage 7, an ink-jet head 8 (liquid jetting head), paper transporting rollers 9, and a purge unit 10 (liquid discharge unit).

An ink to be supplied to the ink-jet head 8 is filled in the ink tank 2. The pump 3 sucks out the ink from the ink tank 2, and transports the sucked ink to the sub tank 6 via the tube 4. The tube 4 connects the ink tank 2 and the sub tank 6, and an ink channel 4a (refer to FIG. 3) which supplies the ink from the ink tank 2 to the sub tank 6 is formed inside the tube 4. The filter 5 is connected to the tube 4 in the middle thereof, and traps air bubbles and impurities in the ink which flows through the ink channel 4a. Accordingly, the ink in which the impurities are removed by the filter 5 is supplied to the sub tank 6. The sub tank 6 supplies the ink supplied from the ink tank 2, to the ink-jet head 8 from an ink supply tube 6a formed in a lower surface of the ink tank 2.

The carriage 7 is formed to be reciprocatably movable in a left and right direction (scanning direction), and the ink-jet head 8 is provided on a lower surface of the carriage 7. The ink-jet head 8 jets the ink from a plurality of nozzles 46 (refer to FIG. 4) formed in a lower surface of the ink-jet head 8. The paper transporting rollers 9 transport a recording paper P in a frontward direction (paper transporting direction). Moreover, in the ink-jet printer 1, a printing is carried out on the recording paper P transported in a paper feeding direction by the paper transporting rollers 9, by jetting the ink from the nozzles 46 of the ink-jet head 8 while reciprocating in the scanning direction along with the carriage 7.

The purge unit 10 has a purge cap 10a and a suction pump 10b (refer to FIG. 8), and sucks out the ink inside the ink-jet head 8. Concretely, when the printing is not carried out, the purge cap 10a covers the lower surface of the ink-jet head 8, and the suction pump 10b sucks out the ink inside the ink-jet head 8 by reducing a pressure inside a space, which is demarcated by the purge cap 10 and the lower surface of the ink-jet head 8. Accordingly, air bubbles and thickened ink are discharged from the ink-jet head 8. An operation of the ink-jet printer 1 is being controlled by a control unit 100 (refer to FIG. 8) as it will be described later.

Figure 2:
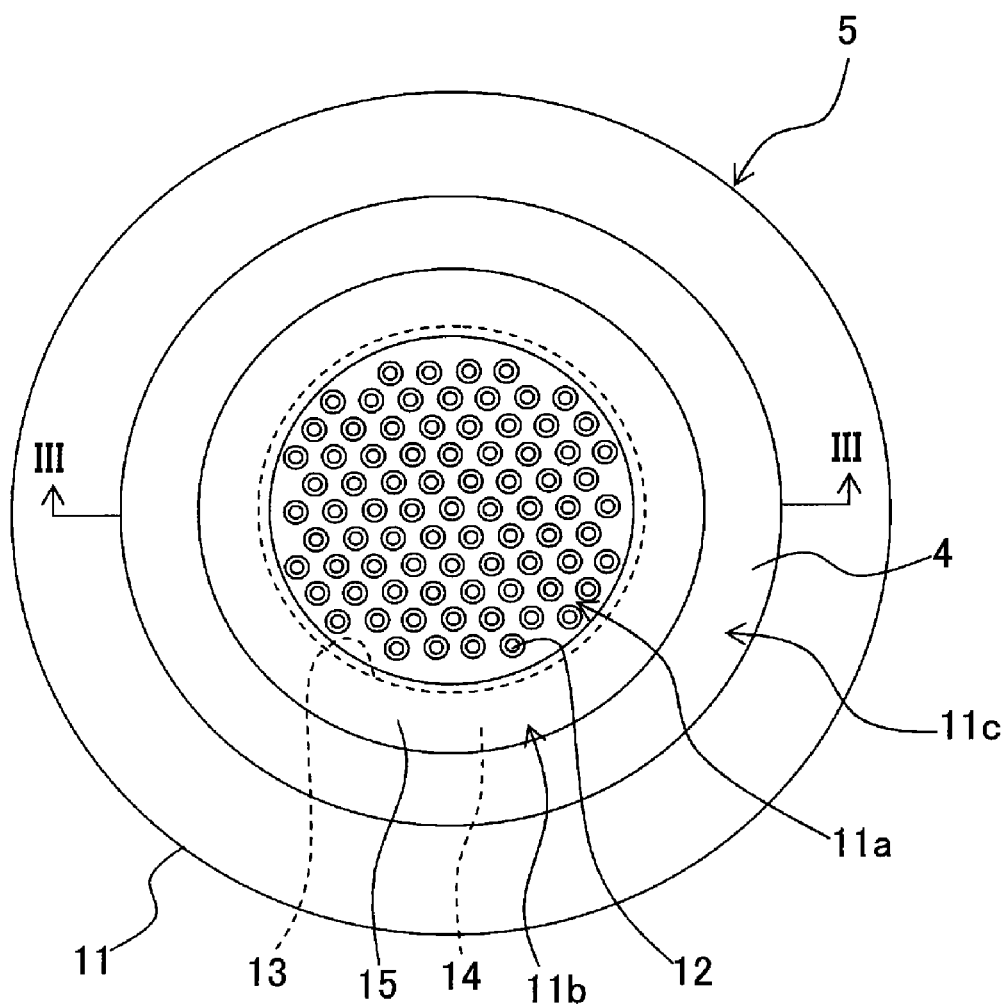
FIG. 2 is a plan view of a filter portion in FIG. 1.
Figure 3:
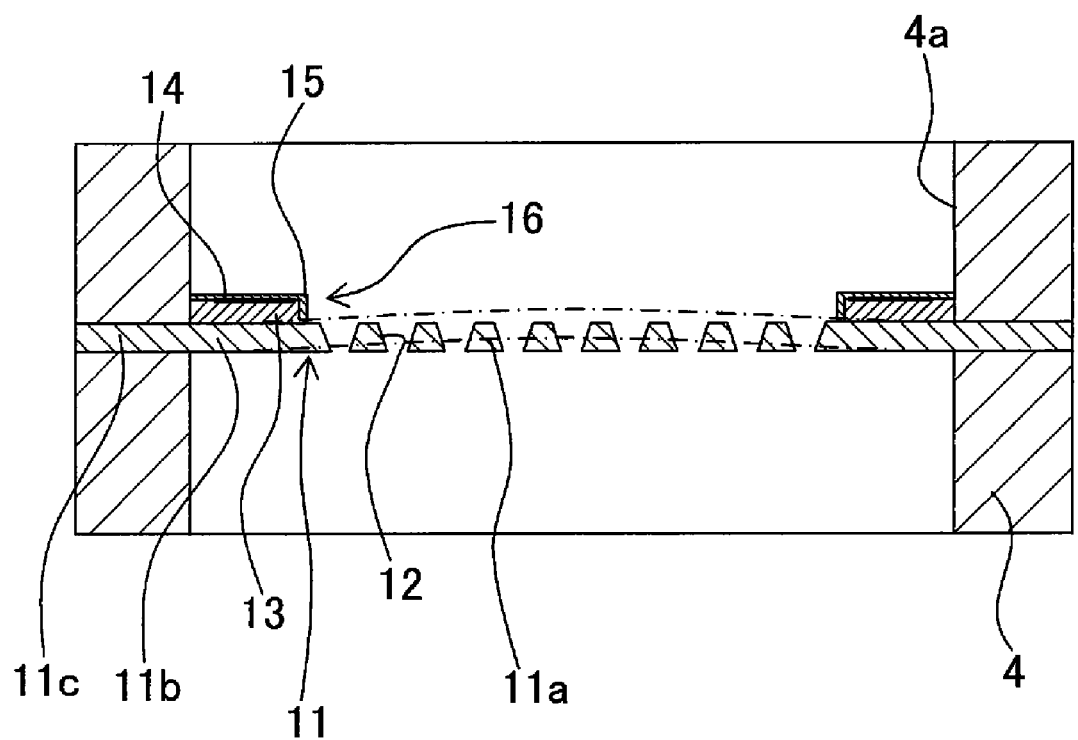
FIG. 3 is a cross-sectional view taken along a line III-III in FIG. 2.

Next, details of the filter 5 will be described below. FIG. 2 is a plan view of the filter 5 shown in FIG. 1, and a portion around the filter 5. FIG. 3 is a cross-sectional view taken around a III-III line in FIG. 2.

As shown in FIGS. 2 and 3, the filter 5 includes a filter plate 11, a piezoelectric layer 13, an electrode 14, and a protective film 15; and a piezoelectric actuator 16 is formed with a portion of the filter plate 11 overlapping with the piezoelectric layer 13, the piezoelectric layer 13, and the electrode 14. The piezoelectric actuator 16 corresponds to a piezoelectric actuator according to the present invention.

The filter plate 11 is a substantially round shaped flat plate made of a metallic material, for example, an iron alloy such as stainless steel, a nickel alloy, an aluminum alloy, and a titanium alloy. A through holes formation portion 11a, a piezoelectric layer arrangement portion 11b, and a fixed portion 11c are provided to the filter plate 11.

The through holes formation portion 11a is a substantially circular shaped portion in a plan view, positioned at a substantially central portion of the filter plate 11. A plurality of through holes 12 which communicate with the ink channel 4a is formed in the through holes formation portion 11a. The through holes 12 have a substantially circular flat shape, and also are tapered such that a diameter thereof becomes progressively smaller toward a downstream side of the channel (lower side in FIG. 3).

The piezoelectric layer arrangement portion 11b is a substantially circular ring shaped portion of the filter plate 11 in a plan view, which is provided adjacent to the through holes formation portion 11a of the filter plate 11, to surround the through holes formation portion 11a. Here, an area occupied by the through holes formation portion 11a in the filter plate 11, and the piezoelectric layer formation portion 11b in the filter plate 11 do not overlap mutually (the through holes formation portion 11a and the piezoelectric layer arrangement portion 11b are provided such that these two portions 11a, 11b do not overlap).

On an upper surface (one surface) of the piezoelectric layer arrangement portion 11b, the piezoelectric layer 13 made of a piezoelectric material having a ferroelectric property, which is composed of mainly lead zirconate titanate (PZT), which is a solid solution of lead titanate and lead zirconate is arranged on almost entire area of the upper surface of the piezoelectric layer 13. The piezoelectric layer 13 has been polarized in advance in a direction of thickness. Here, the piezoelectric layer 13 is formed by an aerosol deposition method (AD method) in which ultra fine particles of a piezoelectric material are deposited by allowing to collide at a high speed on an upper surface of the piezoelectric layer arrangement portion 11b of the filter plate 11. For example, during the fixed portion 11c (an area overlapping with the tube 4) and the through holes formation portion 11a of the filter plate 11 are masked, the piezoelectric layer 13 is formed by the AD method only on the piezoelectric layer arrangement portion 11b, and it is possible to form an electrode and a protective layer on the piezoelectric layer. In addition, it is possible to form the piezoelectric layer 13 by using a sol-gel method, a sputtering method, a hydrothermal synthesis method, or a chemical vapor deposition (CVD) method, and further, it is also possible to form the piezoelectric layer 13 by adhering, on the upper surface of the filter plate 11, a piezoelectric sheet which is obtained by baking a green sheet of PZT.

The fixed portion 11c is a circular ring shaped portion of the filter plate 11 in a plan view, which is adjacent to the piezoelectric layer arrangement portion 11b of the filter plate 11, and which surrounds the piezoelectric layer arrangement portion 11b. Accordingly, both the piezoelectric layer arrangement portion 11b and the through holes formation portion 11a described above are positioned in an area surrounded by the fixed portion 11c, and the through holes formation portion 11a is provided at a substantially central portion of the filter plate 11, and the piezoelectric layer arrangement portion 11b is provided to be surrounding the through holes formation portion 11a. The filter plate 11 is joined to the tube 4 at both surfaces of the fixed portion 11c.

Moreover, the filter plate 11 is connected to a driver IC 63 (refer to FIG. 8) which will be described later, of the control unit 100. Furthermore, the filter plate 11 is kept at a ground electric potential all the time, by the driver IC 63.

The electrode 14 is formed of an electroconductive material such as gold, copper, silver, palladium, platinum, and titanium, and is formed almost on entire area on the upper surface of the piezoelectric layer 13 (surface not facing the filter plate 11). It is possible to form the electrode 14 by a method such as a screen printing, the sputtering method, and a vapor deposition method. The electrode 14 is connected to the driver IC 63, and a driving electric potential is applied to the electrode 14 from the driver IC 63. Here, since the piezoelectric layer 13 is arranged on an outer peripheral portion of a disc shaped area surrounded by the fixed portion 11c, it is possible to form easily a wire (wiring) for connecting the electrode 14 and the driver IC 63 on an outer side of the tube 4.

Here, a method of driving the piezoelectric actuator 16 will be described below. In the piezoelectric actuator 16, the ground electric potential is applied in advance to the electrode 14 by the driver IC 63 When the driving electric potential is applied to the electrode 14 from the driver IC 63 in a state in which the ground electric potential is applied to the electrode 14, an electric potential difference is generated (developed) between the electrode 14 and the filter plate 11 which also serves as one electrode for driving the piezoelectric actuator 16 kept at the ground electric potential (a drive voltage which drives the piezoelectric actuator 16 is applied to a portion of the piezoelectric layer 13 sandwiched between the electrode 14 and the filter plate 11), an electric field is generated in the piezoelectric layer 13 in a direction of thickness. Due to the electric field, the piezoelectric layer 13 is contracted in a horizontal direction which is orthogonal to the direction of thickness, and accordingly, the filter plate 11 is deformed to be projected upward as shown by alternate long and short dashed lines in FIG. 3. When the electric potential of the electrode 14 is returned to the ground electric potential, the contraction of the piezoelectric layer 13 is returned to an original shape, and the deformation of the filter plate 11 also returns to the original shape. In this manner, the filter plate 11 vibrates by carrying out repeatedly an operation of applying the driving electric potential to the electrode 14, and returning thereafter to the ground electric potential, and due to the vibration of the filter plate 11, the air bubbles adhered to the through holes 12 are separated from the filter plate 11.

The protective film 15 is made of an insulating (non-electroconductive) material, and is formed on the upper surface of the filter plate 11 to cover the piezoelectric layer 13 and the electrode 14. Accordingly, the ink in the ink channel 4a is prevented from making a contact with the piezoelectric layer 13 and the electrode 14, and getting shorted (short-circuit).

Figure 4:
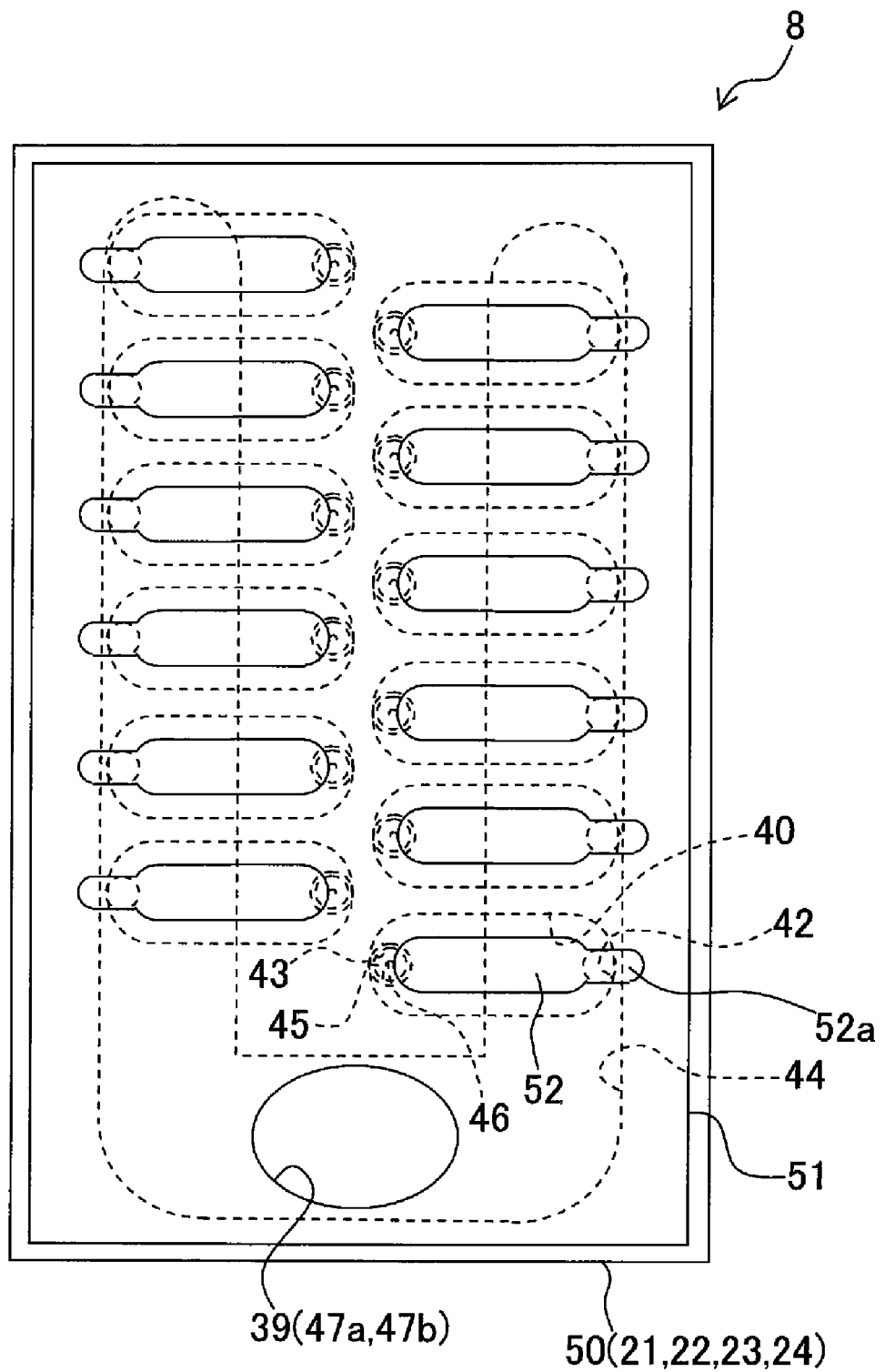
FIG. 4 is a plan view of an ink-jet head in FIG. 1.
Figure 5:
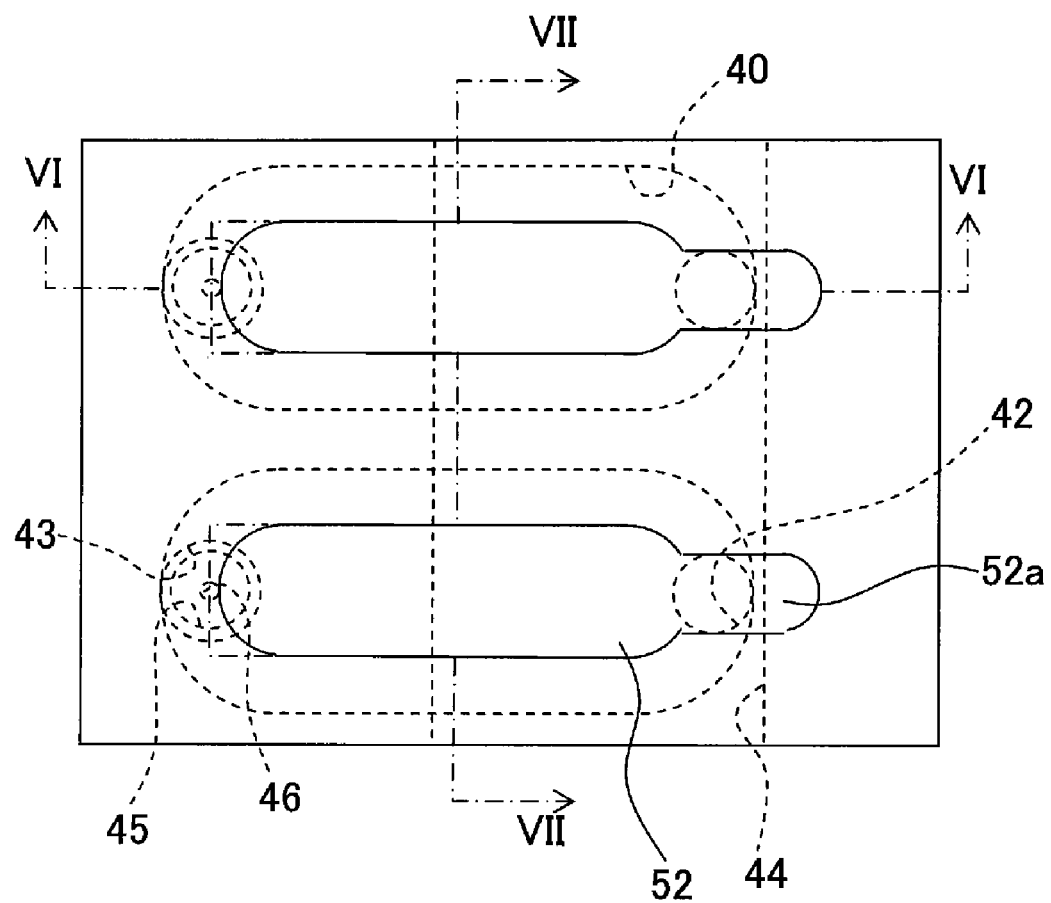
FIG. 5 is a partially enlarged view of FIG. 4.
Figure 6:
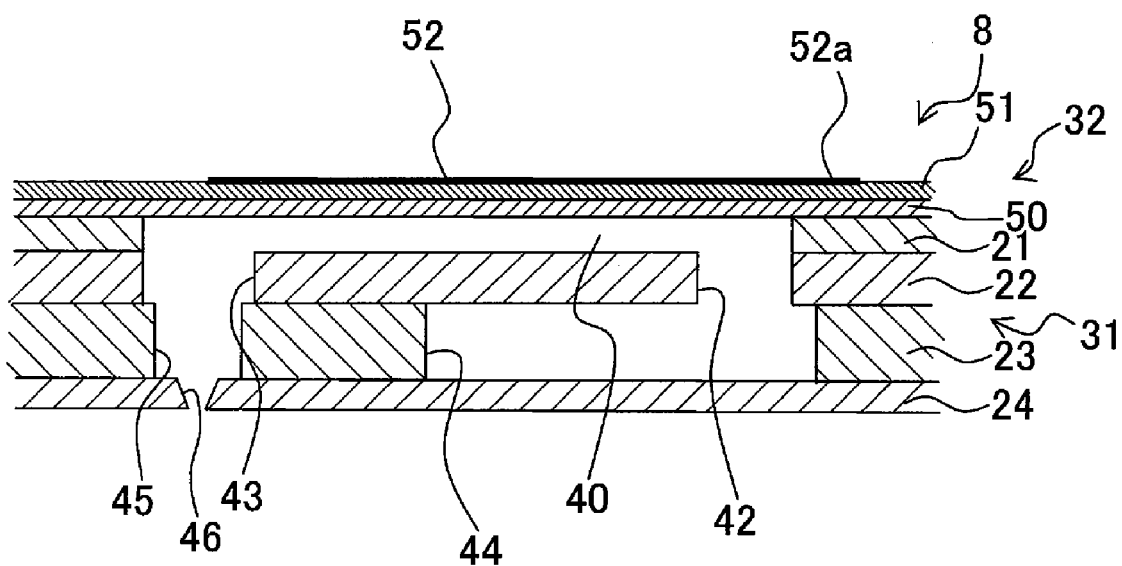
FIG. 6 is a cross-sectional view taken along a line VI-VI in FIG. 5.
Figure 7:
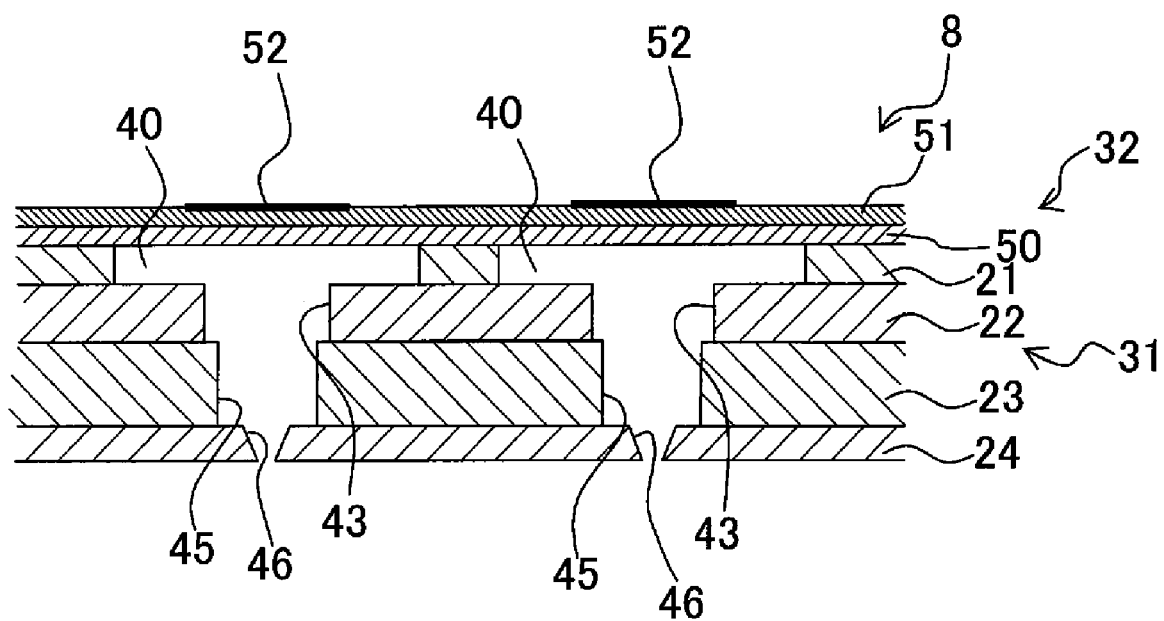
FIG. 7 is a cross-sectional view taken along a line VII-VII in FIG. 5.

Next, the ink-jet head 8 will be described below. FIG. 4 is a plan view of the ink-jet head 8 in FIG. 1. FIG. 5 is a partially enlarged view of FIG. 4. FIG. 6 is a cross-sectional view taken along a VI-VI line in FIG. 5. FIG. 7 is a cross-sectional view taken along a VII-VII line in FIG. 5.

As shown in FIGS. 4 to 7, the ink-jet head 8 includes a channel unit 31 in which a plurality of individual ink channels is formed, and a piezoelectric actuator 32 which is arranged on an upper surface of the channel unit 31.

The channel unit 31 includes a cavity plate 21, a base plate 22, a manifold plate 23, and a nozzle plate 24, and these four plates 21 to 24 are joined in a stacked layered form. The cavity plate 21, the base plate 22, and the manifold plate 23 are made of stainless steel and these plates have a substantially rectangular shape. Moreover, the nozzle plate 24 is formed of a high-molecular synthetic resin material such as polyimide, and is adhered (stuck) to a lower surface of the manifold plate 22. The nozzle plate 24 may also be formed of a metallic material similarly as other three plates 21, 22, and 23.

A plurality of pressure chambers 40 arranged along a plane is formed in the cavity plate 21. Each of the pressure chambers 40 is formed to be substantially elliptical shaped in a plan view, and is arranged such that a longitudinal direction of the pressure chamber 40 is the scanning direction (left and right direction in FIG. 4). The pressure chambers 40 open in an upper surface (one surface) of the cavity plate 21. Moreover, a through hole 47a of which circumference has a substantially elliptical shape, and the scanning direction as a longitudinal direction in a plan view is formed in the cavity plate 21, near a lower-end portion in FIG. 3. The through hole 47a opens on the upper surface of the cavity plate 21.

Communicating holes 42 and 43 are formed in the base plate 22, at positions overlapping with both end portions in a longitudinal direction of the pressure chamber 40 in a plan view. Moreover, a through hole 47b is formed in the base plate 22, at a position overlapping with the through hole 47a in a plan view.

A manifold channel 44 (common liquid chamber), which is extended in two rows in a paper feeding direction (vertical direction in FIG. 4), and which overlaps with a left-end portion or a right-end portion in FIG. 4 of the pressure chamber 40 in a plan view is formed in the manifold plate 22. The two portions of the manifold channel 44 extended in the paper feeding direction are connected mutually upon being bent inward in the scanning direction in the lower-end portion in the FIG. 4. Moreover, the manifold channel 44 communicates with the through holes 47a and 47b in these two portions. Here, the manifold channel 44 and the through holes 47a and 47b correspond to the common ink chamber according to the present invention. Ink is supplied to the manifold channel 44 from the sub tank 6, via the ink supply tube 6a, a through hole 39 formed in a vibration plate 50 which will be described later, and the through holes 47a and 47b. Moreover, a communicating hole 45 is formed in the manifold plate 22, at a position overlapping with an end portion of the pressure chamber 40, on an opposite side of the manifold channel 44, in a plan view. The plurality of nozzles 46 is formed in the nozzle plate 23, at positions overlapping with the end portion of the pressure chamber 40, on the opposite side of the manifold channel 44, in a plan view.

Moreover, in the channel unit 31, as shown in FIGS. 4 to 7, the manifold channel 44 communicates with the pressure chamber 40 via the communicating hole 42, and further, the pressure chamber 40 communicates with the nozzle 46 via the communicating holes 43 and 45. In this manner, a plurality of individual ink channels from an exit port of the manifold channel 44 up to the nozzle 46 via the pressure chamber 40 is formed in the channel unit 31.

Next, the piezoelectric actuator 32 will be described below. As shown in FIGS. 4 to 7, the piezoelectric actuator 32 has the vibration plate 50 which is electroconductive and is arranged on a surface of the cavity plate 21, a piezoelectric layer 51 which is formed continuously on an upper surface of the vibration plate 50 over the pressure chambers 40, and a plurality of individual electrodes 52 which are formed corresponding to the pressure chambers 40 on a surface of the piezoelectric layer 51.

The vibration plate 50 is made of a metallic material such as an iron alloy like stainless steel, a nickel alloy, an aluminum alloy, and a titanium alloy, and is joined to the cavity plate 21 so as to cover the pressure chambers 40 as shown in FIGS. 4 to 7. This vibration plate 50 also serves as a common electrode which is arranged to face the individual electrodes 52 and which causes an electric field to act in the piezoelectric layer 51 between the vibration plate 50 and the individual electrode 52. The vibration plate 50 is connected to a driver IC 66 (refer to FIG. 8) and is kept at the ground electric potential all the time.

The piezoelectric layer 51 mainly composed of PZT is formed on the upper surface of the vibration plate 50. The piezoelectric layer 51 is formed continuously over an entire area on the upper surface of the vibration plate 50 over the pressure chambers 40. The piezoelectric layer 51 is polarized in advance in a direction of thickness thereof. The piezoelectric layer 51, similarly as the piezoelectric layer 13, is formed by a method such as the AD method.

The plurality of individual electrodes 52 having a substantially elliptical flat shape slightly smaller than the pressure chamber 40 is formed on an upper surface of the piezoelectric layer 51 as shown in FIGS. 4 to 7. The individual electrodes 52 are formed to be overlapping with a central portion of the corresponding pressure chambers 40 in a plan view. The individual electrode 52 is made of an electroconductive material such as gold, copper, silver, palladium, platinum, and titanium. Further, a plurality of contact portions 52a, each extended from one end portion of the individual electrodes 52 (end portion toward the manifold channel 44) up to a portion not facing the pressure chamber 40 in a plan view are formed on the upper surface of the piezoelectric layer 51. It is possible to form the individual electrodes 52 and the contact points 52a by a method such as the screen printing, the sputtering method, and the vapor deposition method. Moreover, the contact points 52a are connected to the driver IC 66 (refer to FIG. 8) via a flexible printed circuit (FPC), which is not shown in the diagram.

Next, an operation of the piezoelectric actuator 32 will be described below. When a driving electric potential is selectively applied from the driver IC 66 to the individual electrodes 52 via the FPC, an electric field in a vertical direction is generated in a portion of the piezoelectric layer 51 sandwiched between the individual electrodes 52 and the vibration plate, the individual electrodes applying the driving electric potential therethrough and the vibration plate applying the ground electric potential to serve as the common electrode. As the electric field is generated, a portion of the piezoelectric layer 51, directly under the individual electrodes 52 to which the driving electric potential is applied is contracted in a horizontal direction which is vertical to the direction of thickness which is a direction of polarization. Moreover, with the contraction of the portion of the piezoelectric layer 51, the vibration plate 50 and the piezoelectric layer 51 in an area facing the pressure chambers 40 are deformed to project toward the pressure chambers 40. Accordingly, since a volume of the pressure chamber 40 is decreased, and a pressure in the ink is increased, the ink is jetted from the nozzle 46 communicating with the pressure chamber 40.

Figure 8:
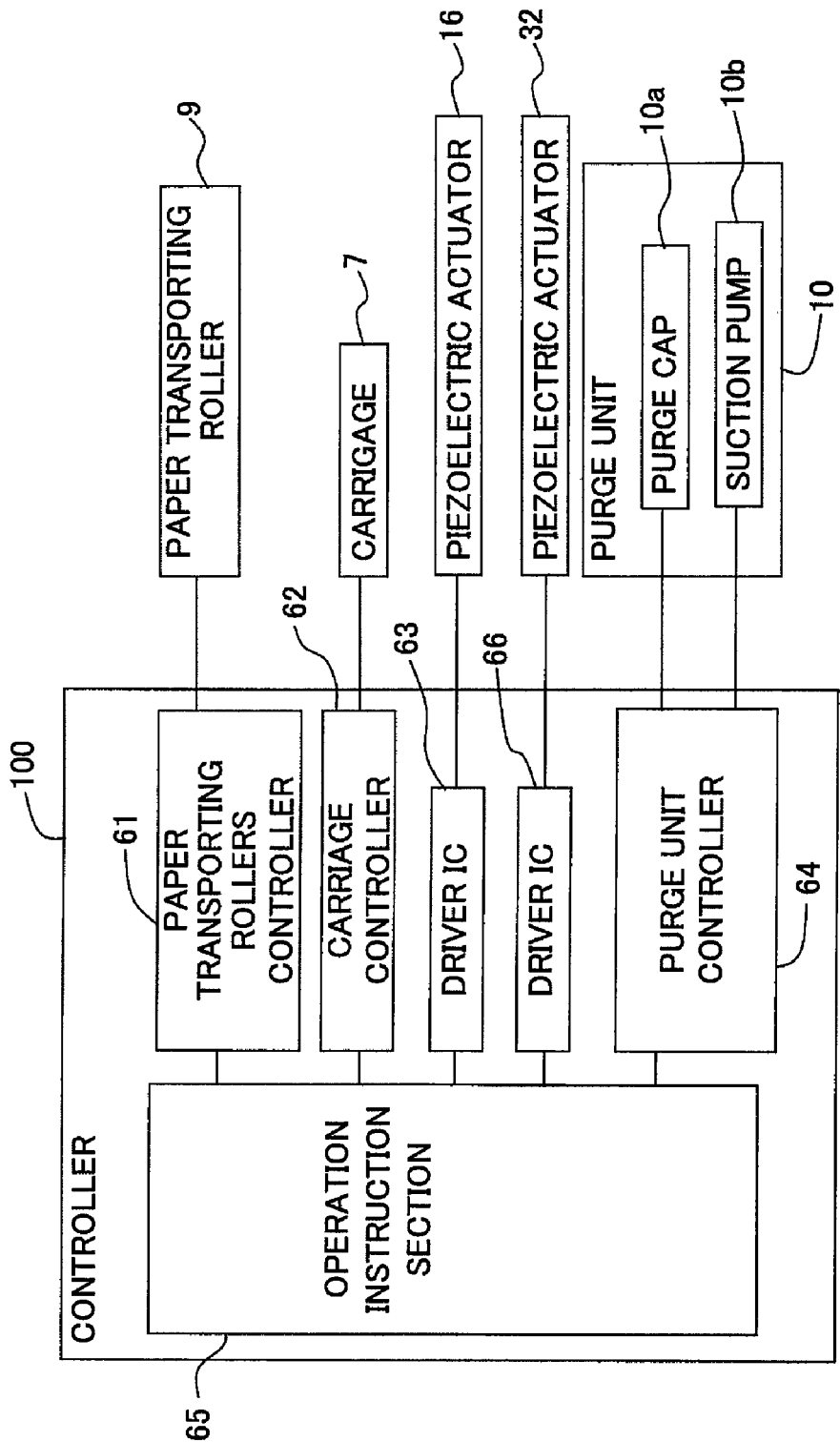
FIG. 8 is a functional block diagram of a control unit in FIG. 1.

Next, the control unit 100 will be described below in detail. FIG. 8 is a functional block diagram of the control unit 100.

As shown in FIG. 8, the control unit 100 has a paper transporting rollers control section 61, a carriage control section 62, the driver ICs 63 and 66, a purge unit control section 64, and an operation instruction section 65. The paper transporting rollers control section 62 controls an operation of the paper transporting rollers 9. The carriage control section 62 controls an operation of the carriage 7. The driver IC 63 controls an operation of the piezoelectric actuator 16. The driver IC 66 controls an operation of the piezoelectric actuator 32. The purge unit control section 64 controls an operation of the purge cap 10a and the suction pump 10b of the purge unit 10. The operation instruction section 65 transmits (sends) signals instructing to carry out printing and purge to the paper transporting rollers control section 61, the carriage control section 62, the driver ICs 63 and 66, and the purge unit control section 64.

Here, an operation of the control unit 100 in a case of carrying out printing and purge in the ink-jet printer 1 will be described below.

In a case of carrying out printing on a recording paper P by the ink-jet printer 1, in the control unit 100, the operation control section 65 (operation instruction section 65) transmits a signal giving an instruction to carry out printing to the paper transporting rollers control section 61, carriage control section 62, and the driver IC 66. Upon receiving the signal, the paper transporting rollers control section 61 controls the paper transporting rollers 9 to transport the recording paper P in a direction of paper transporting, the carriage control section 62 controls the operation of the carriage 7 to reciprocate in the scanning direction, and the driver IC 66 applies the driving electric potential to the individual electrode 52 according to the printing instruction. Accordingly, the ink is jetted to the recording paper P, transported in the direction of paper transporting, from the nozzle 46 of the ink-jet head 8 reciprocating in the scanning direction along with the carriage 7, and the printing is carried out on the recording paper P.

At this time, since the ink for carrying out the printing is supplied to the ink-jet head 8 from the ink tank 2 by passing through the filter 5, the ink is supplied to the ink-jet head 8 after air bubbles and impurities in the ink are trapped in the through holes 12 in the filter 5. On the other hand, the driver IC 63 continues to keep the electric potential of the electrode 14 at the ground electric potential without changing, and at this time, the filter plate 11 is not vibrated and the through holes 12 are maintained to be in a state of having trapped the air bubbles and impurities. Accordingly, the air bubbles and impurities are hardly mixed with the ink inside the ink-jet head 8, and jetting characteristics of the ink to be jetted from the nozzle 46 are prevented from being changed (fluctuated) due to the air bubbles and impurities in the ink. Consequently, a printing quality is maintained in the ink-jet printer 1.

On the other hand, in a case of carrying out purge, the operation instruction section 65 transmits (sends) a signal giving an instruction to carry out purge to the carriage control section 62, the drier IC 63, and the purge unit control section 64. Upon receiving the signal, the carriage control section 62 controls the operation of the carriage 7 to move the carriage 7 up to a position facing the purge cap 10a. When the carriage 7 has reached the position facing the purge cap 10a, the purge unit control section 64 moves the purge cap 10a upward, and after bringing in a close contact with the lower surface of the ink-jet head 8, the suction pump 10b reduces a pressure inside a space surrounded by the purge cap 10a and the lower surface of the ink-jet head 8, then the ink is sucked out from the ink-jet head 8. At the same time, the driver IC 63 changes the electric potential of the electrode 14 as it has been described above, and makes the filter plate 11 vibrate.

Here, when the ink is sucked out from the ink-jet head 8, the ink of the same amount as sucked out from the ink-jet head 8 is supplied to the ink-jet head 8 from the ink tank 2 via the tube 4, the filter 5, and the sub tank 6. However, the air bubbles inside the tube 4 are trapped in the through holes 12. When the filter plate 11 is not vibrating, the air bubbles are not separated from the through holes 12, and are remained in the through holes 12 even though the ink inside the ink-jet head 8 is sucked out. Further, the through holes 12 are blocked due to the air bubbles remained in the through holes 12, and the life of the filter 5 becomes short.

Whereas, in the embodiment, since the filter plate 11 is controlled to vibrate at the time of carrying out purge, the air bubbles are separated from the through holes 12 due to the vibration of the filter plate 11, and these air bubbles are sucked out from the nozzle 46 along with the ink. Accordingly, the blocking of the through holes 12 due to the air bubbles is eliminated, and the life of the filter 5 becomes long.

It is desirable to make the filter plate 11 vibrate almost at the same time as of applying a negative pressure to the ink in the tube 4 by driving the suction pump 10b, and further, it is desirable that a time for which the negative pressure is applied to the ink is not less than double the time of making the filter plate 11 vibrate. For example, in a case of applying the negative pressure to the ink by driving the suction pump 10b for the time in a range of three seconds to six seconds, it is desirable to make the filter plate 11 vibrate for first one to two seconds. The air bubbles or the like which have come off the filter plate 11 are prevented from being trapped again in the filter plate 11 by securing sufficiently a time of passing the air bubbles which have come off by the first vibration through the through holes 12. Here, it is desirable that a frequency of vibration of the filter plate 11 is in a range of 20 Hz to 30 Hz. However, the frequency of vibration is not restricted to a frequency in this range.

According to the embodiment described above, in a case of carrying out printing on a recording paper by the ink-jet head 8, the ink in which the air bubbles and impurities in the ink are trapped by passing through the through holes 12 formed in the filter plate 11 is supplied to the ink-jet head 8. Consequently, it is possible to prevent the jetting characteristics of the ink in the ink-jet head 8 from being changed due to the air bubbles and the impurities in the ink.

On the other hand, since the filter plate 11 is made to vibrate at the time of carrying out purge, the air bubbles adhered to the through holes 12 are separated from the through holes 12. Consequently, the air bubbles adhered to the through holes 12 are sucked out assuredly. Accordingly, the blocking due to the air bubbles in the through holes 12 is eliminated, and the life of the filter 5 becomes long.

Moreover, the filter plate 11 is fixed to the tube 4 at the ring shaped fixed portion 11c, and the through holes 12 are formed in the through holes formation portion 11a positioned at a substantially central portion of the area surrounded by the fixed portion 11c, and furthermore, the piezoelectric layer 13 is arranged on the upper surface of the piezoelectric layer arrangement portion 11b surrounding the through holes formation portion 11a. Therefore, when the piezoelectric actuator 16 is driven, the portion of the filter plate 11 in which the through holes 12 are formed is susceptible to vibrate, and the air bubbles adhered to the through holes 12 are separated from the through holes 12. Moreover, since the piezoelectric layer 13 is provided on an outer side of the portion surrounded by the fixed portion 11c, it is possible to form easily a wire for connecting the driver IC 63 and the electrode 14 arranged on the surface of the piezoelectric layer 13.

Moreover, since the piezoelectric layer 13 and the electrode 14 are covered by the protective film 15, it is possible to prevent the piezoelectric layer 13 and the electrode 14 from making a contact with the ink. Moreover, since the piezoelectric layer 13 and the electrode 14 are covered by the protective film 15, and the filter plate 11 is kept at a constant electric potential (ground electric potential) all the time, there is no electric separation (electrolysis) due to action of an electric potential difference in the liquid (ink). Accordingly, even when the liquid (ink) is an aqueous solution, there is no possibility of change in properties. Here, the protective film 15 may be of a material such as a fluororesin, an epoxy resin, or a ceramic film of a material such as alumina and zirconia. It is possible to form an epoxy resin film by applying an epoxy adhesive or by a chemical vapor deposition (CVD) method. Moreover, it is possible to form a ceramics film by the AD method described above.

Moreover, since the filter plate 11 also serves as one of the electrodes for driving the piezoelectric layer 13, it is possible to reduce a cost of the filter 5.

Next, modified embodiments in which various modifications are made in the embodiment will be described below. Same reference numerals are assigned to components having a structure similar as in the above embodiment, and the description of such components is omitted appropriately.

Figure 9:
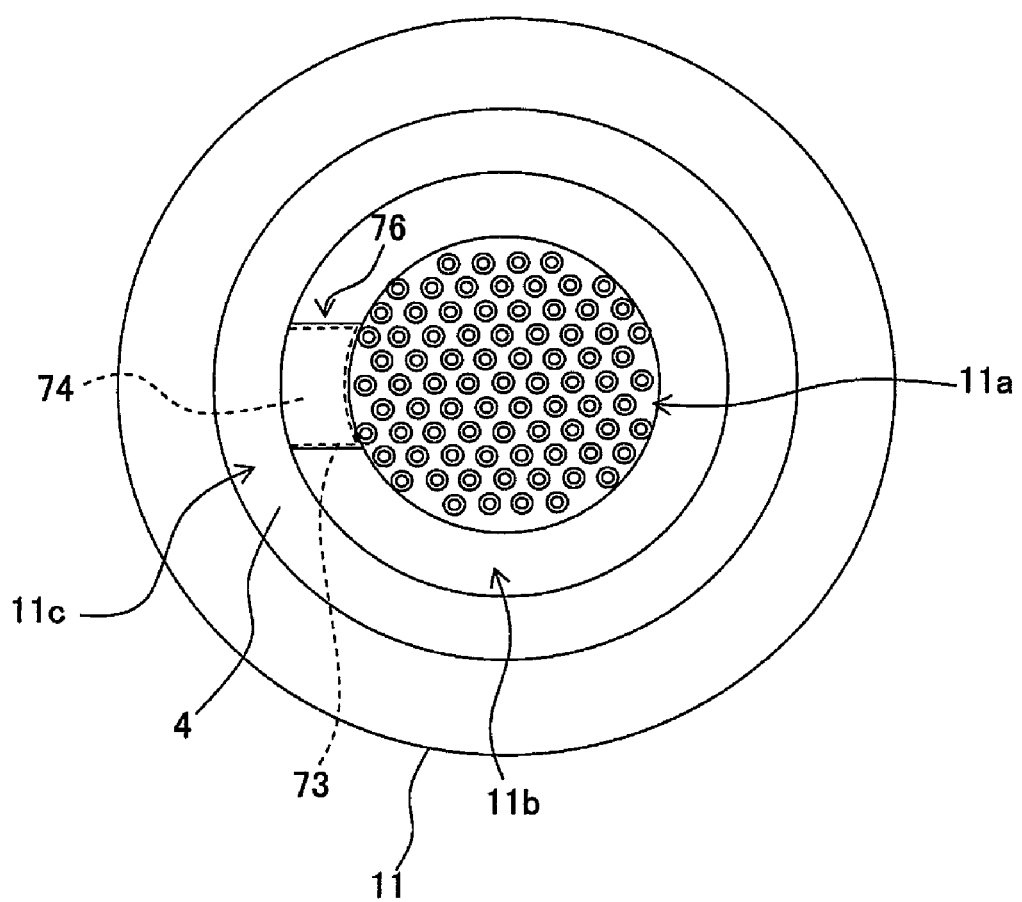
FIG. 9 is a plan view corresponding to FIG. 2, of a first modified embodiment.

In the embodiment, the piezoelectric layer 13 was arranged on the entire area of the upper surface of the piezoelectric layer formation portion 11b. However, in a first modified embodiment, as shown in FIG. 9, a piezoelectric layer 73 is formed only on an upper surface of a part of the piezoelectric layer formation portion 11b (left end portion of the piezoelectric layer formation portion 11b in FIG. 9). In this case, a piezoelectric actuator 76 is formed by a portion of the filter plate 11 overlapping with the piezoelectric layer 73, the piezoelectric layer 73, and an electrode 74.

Even in this case, similarly as in the embodiment, since the through holes 12 and the piezoelectric layer 13 are formed in a portion surrounded by the fixed portion 11c fixed to the tube 4, it is possible to make vibrate substantially the portion of the filter plate 11 in which the through holes 12 are formed, by changing the electric potential of the electrode 14, and accordingly, the air bubbles adhered to the through holes 12 are separated assuredly from the through holes 12.

Figure 10:
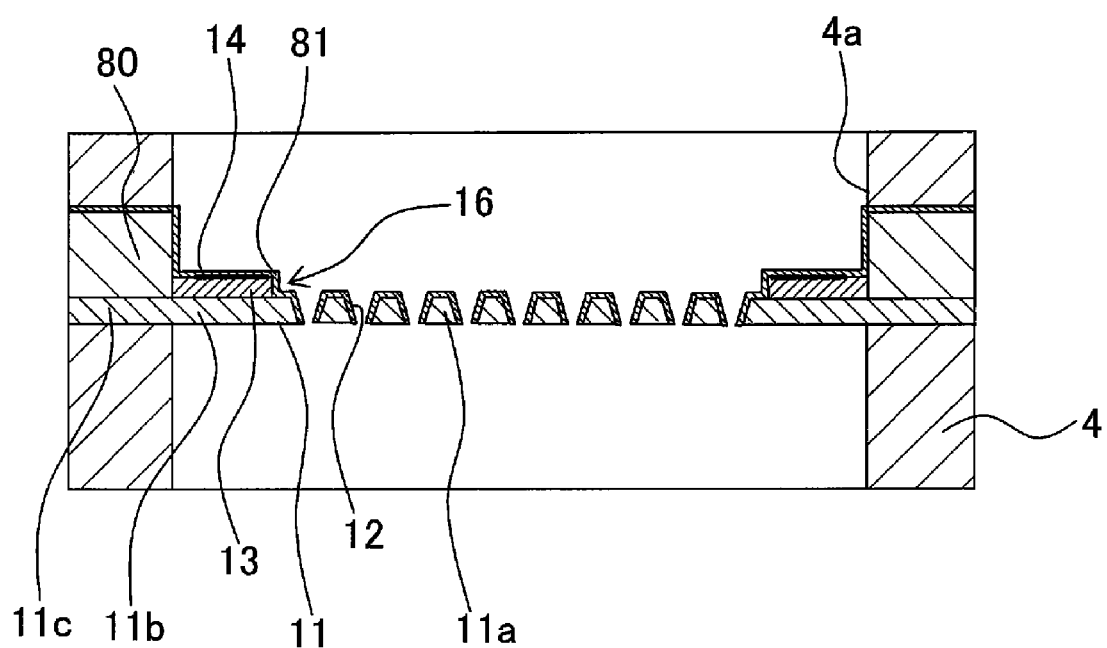
FIG. 10 is a cross-sectional view corresponding to FIG. 3, of a second modified embodiment.

In a second modified embodiment, as shown in FIG. 10, a cylindrical member 80 having a diameter almost same as a diameter of the tube 4 is joined to the upper portion of the fixed portion 11c of the filter plate 11, and an upper end of the cylindrical member 80 is joined to the tube 4. Moreover, a protective layer 81, as well as the piezoelectric layer 13 and the electrode 14, cover an inner wall surface of the cylindrical member 80 adjacent to the piezoelectric layer 13, the upper end of the cylindrical member 80 which is joined to the tube 4, and also an entire upper surface of the filter plate 11.

In this case, the piezoelectric layer 13 and the electrode 14 are covered widely by the protective layer 81. In addition, the cylindrical member 80 adjacent to the piezoelectric layer 13, and a portion of the filter plate 11 adjacent to the piezoelectric layer 13 are also covered by the protective layer 81. Therefore, the ink is prohibited assuredly from entering, into a gap between the cylindrical member 80 and the protective layer 81 or a gap between the filter plate 11 and the protective layer 81, to make a contact with the piezoelectric layer 13 and the electrode 14.

Further, since the entire upper surface of the filter plate 11 is covered by the protective layer 81, a corrosion resistance of the filter plate 11 becomes high, and a durability life of the filter becomes long. In this description, words "a life of the filter" mean a period during which the filter functions without clogging, and words "a durability life of the filter" mean a period during which the filter functions without being destroyed. Moreover, it is possible to form easily the protective layer 81 by depositing a material forming the protective layer 81 by a method such as the AD method in which the material forming the protective layer is deposited from one direction on the filter plate 11 on which the piezoelectric layer 13, the electrode 14, and the cylindrical member 80 are formed on a surface thereof.

The corrosion of the filter plate 11 is likely to occur on the upstream-surface of the ink channel with which the foreign matters in the ink have many opportunities to come in contact. That is, the corrosion of the filter plate 11 is likely to occur on the upper surface of the filter plate 11 in FIG. 10. When the upper surface of the filter plate 11 is entirely covered with the protective layer 81, the corrosion of the filter plate 11 can be effectively prohibited. The protective layer may be formed on the lower surface of the filter plate 11 in addition to the upper surface thereof.

Figure 11:
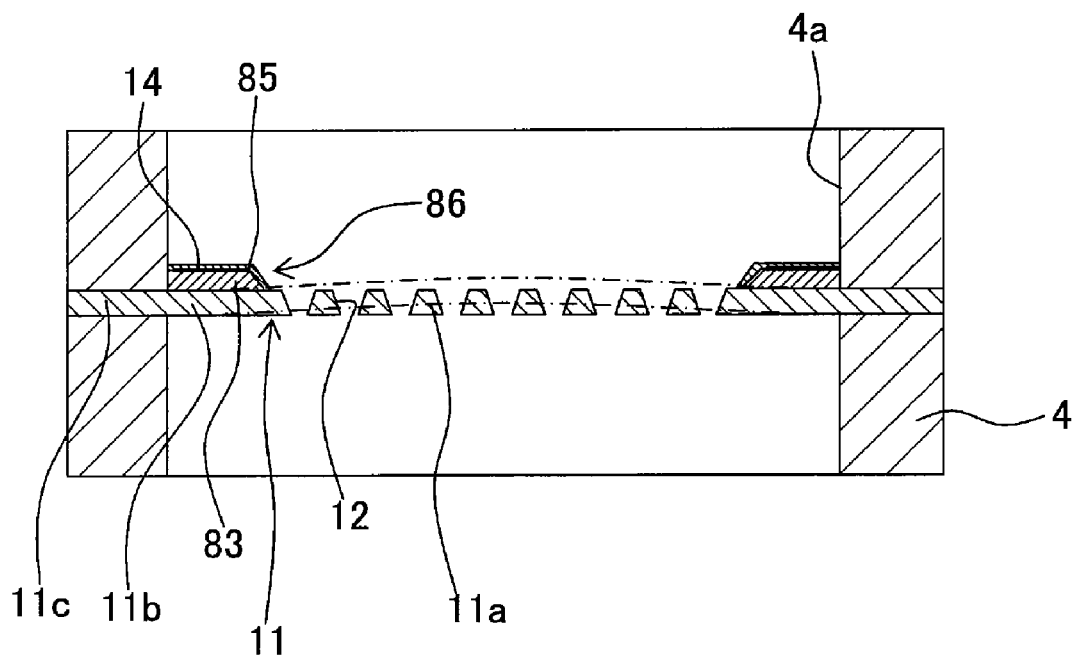
FIG. 11 is a cross-sectional view corresponding to FIG. 3, of a third modified embodiment.

In a third modified embodiment, as shown in FIG. 11, an inside surface of a piezoelectric layer 83 is inclined so that the inside surface is positioned at more inner side of the filter plate 11, toward a lower direction in FIG. 11. In other words, as a portion of the side surface of the piezoelectric layer 83, adjacent to the through holes formation portion 11a is progressively closer to one surface of the filter plate 11, it is inclined to be closer to the through holes formation portion 11a. The electrode 14 is formed on an upper surface of the piezoelectric layer 83, similarly as in the embodiment, and the piezoelectric layer 83 and the electrode 14 are covered by a protective layer 85. In this case, a piezoelectric actuator 86 is formed by a portion of the filter plate 11 overlapping with the piezoelectric layer 83, the piezoelectric layer 83, and the electrode 84.

In this case, the ink inside the ink channel 4a is susceptible to flow toward the through holes 12 along the inclined side surface of the piezoelectric layer 83. Accordingly, the air bubbles are hardly accumulated in a portion adjacent to the side surface of the piezoelectric layer 83, and the air bubbles in the ink are discharged assuredly to an outside at the time of purge.

Figure 12:
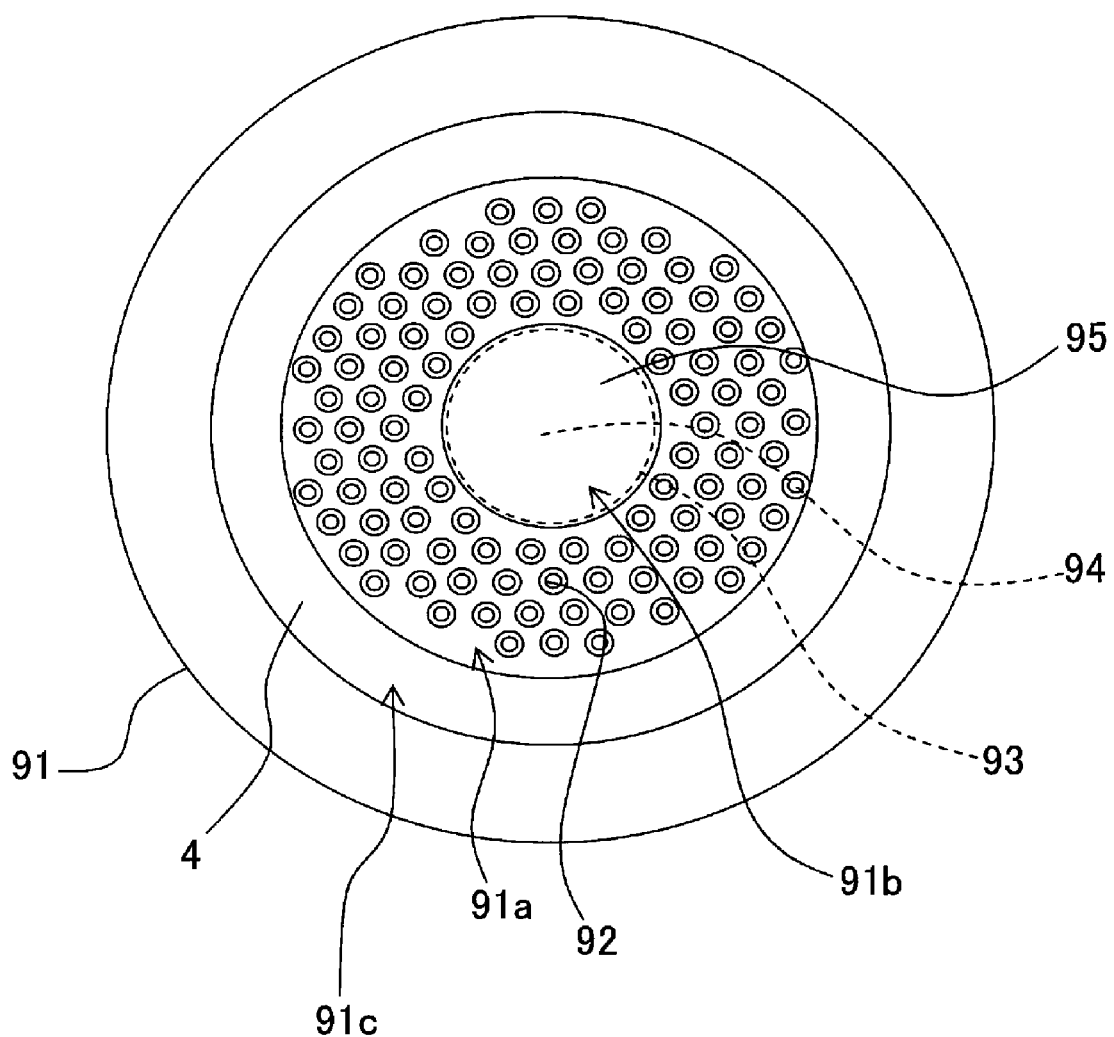
FIG. 12 is a plan view corresponding to FIG. 2, of a fourth modified embodiment.
Figure 13:
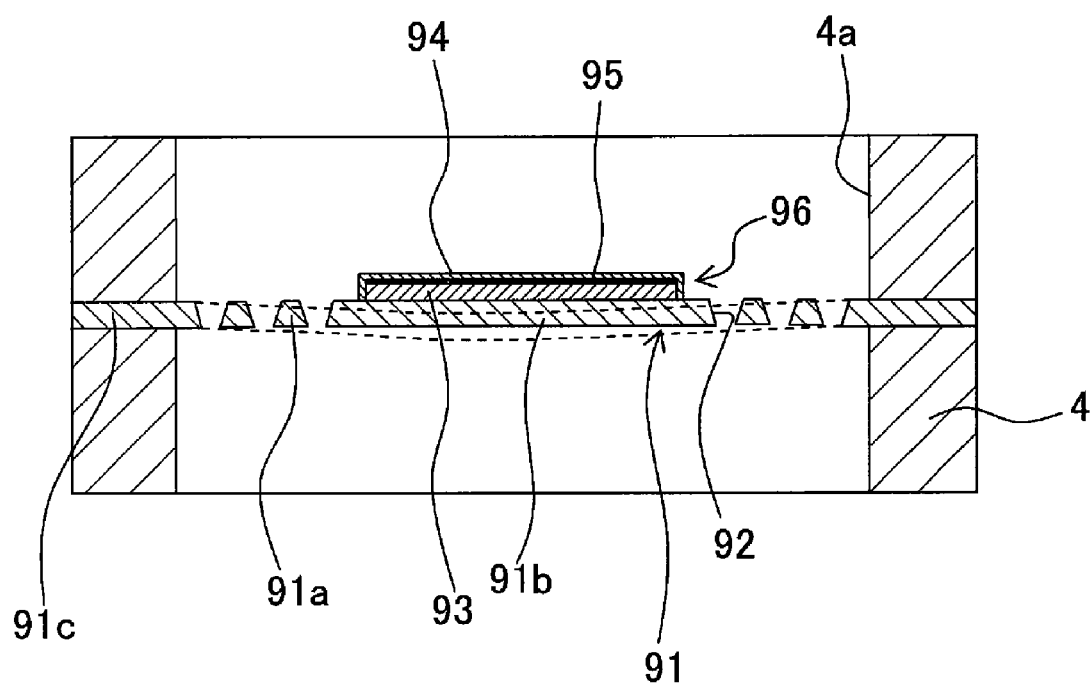
FIG. 13 is a cross-sectional view corresponding to FIG. 3, of the fourth modified embodiment.

In a fourth modified embodiment, as shown in FIGS. 12 and 13, a substantially central portion of a portion of a filter plate 91, surrounded by a fixed portion 91c has become a piezoelectric layer arrangement portion 91b, and a through holes formation portion 91a is provided to surround the piezoelectric layer arrangement portion 91b. In other words, the through holes formation portion 91b is provided on an outer peripheral side of an area surrounded by the fixed portion 91c, and the piezoelectric layer arrangement portion 91b is provided on an inner side of the through holes formation portion 91a. Moreover, a piezoelectric layer 93 is arranged on an upper surface of the piezoelectric layer arrangement portion 91b, and an electrode 94 is formed on an upper surface of the piezoelectric layer 93. Furthermore, a protective layer 95 is formed on the upper surface of the piezoelectric layer 93 to cover the piezoelectric layer 93 and the electrode 94. A plurality of through holes 92 is formed in the through holes formation portion 91a. In this case, a piezoelectric actuator 96 is formed with a portion of the filter plate 91 overlapping with the piezoelectric layer 93, the piezoelectric layer 93, and the electrode 94.

Generally, in an ink channel, a flow speed of the ink is slower at an outer peripheral portion than a central portion thereof, and air bubbles are susceptible to be accumulated on the outer peripheral side of the ink channel. However, in a case of the fourth modified embodiment, since the through holes 92 are formed on an outer peripheral side of the ink channel 4a formed by the tube 4, it is possible to trap efficiently the air bubbles in the ink flowing near the outer peripheral side of the ink channel 4a, by the through holes 92. Moreover, when the piezoelectric actuator 96 is driven by changing an electric potential of the electrode 94 similarly as the electrode 14 (refer to FIG. 3) in the embodiment, the filter plate 91 vibrates. Accordingly, since the air bubbles adhered to the through holes 92 are separated from the through holes 92, it is possible to discharge assuredly the air bubbles in the ink to the outside by making the filter plate 91 vibrate at the time of carrying out purge.

Figure 14:
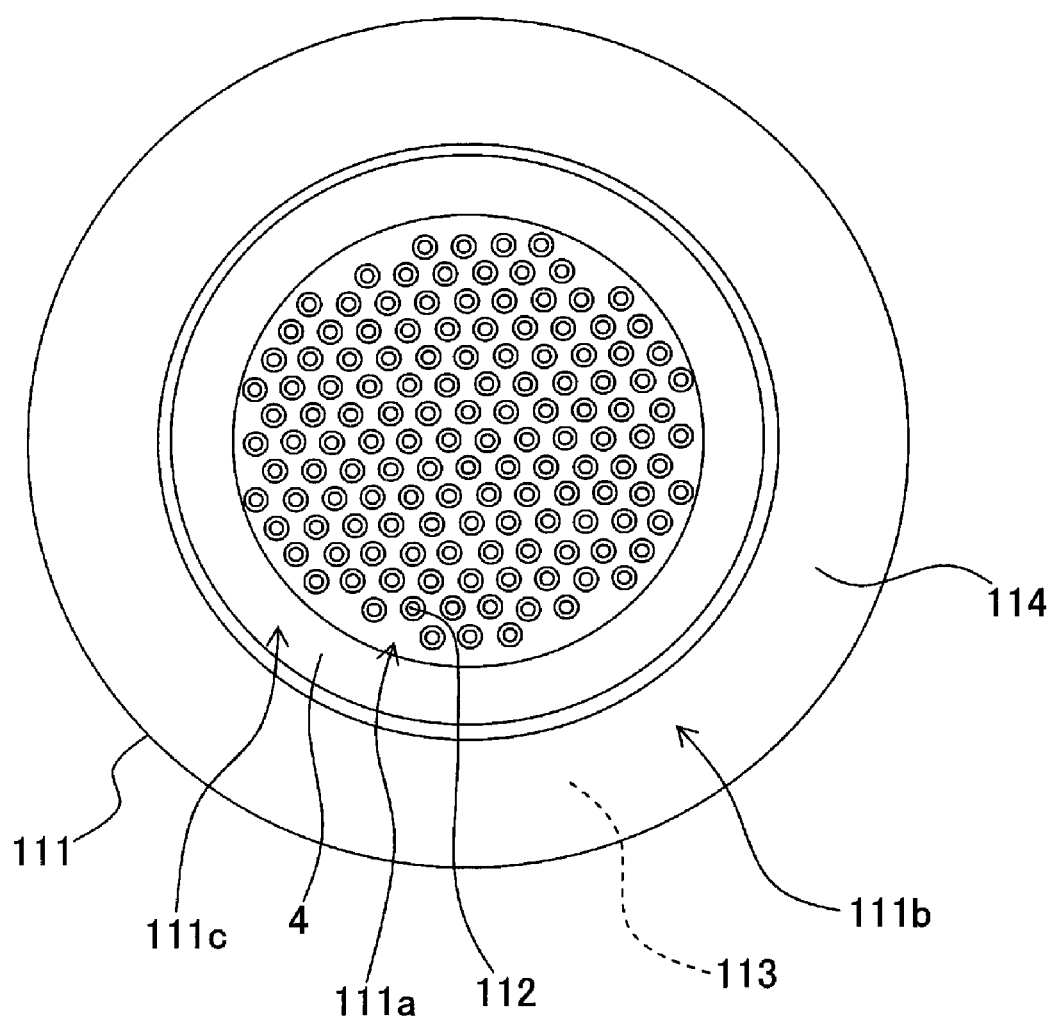
FIG. 14 is a plan view corresponding to FIG. 2, of a fifth modified embodiment.
Figure 15:
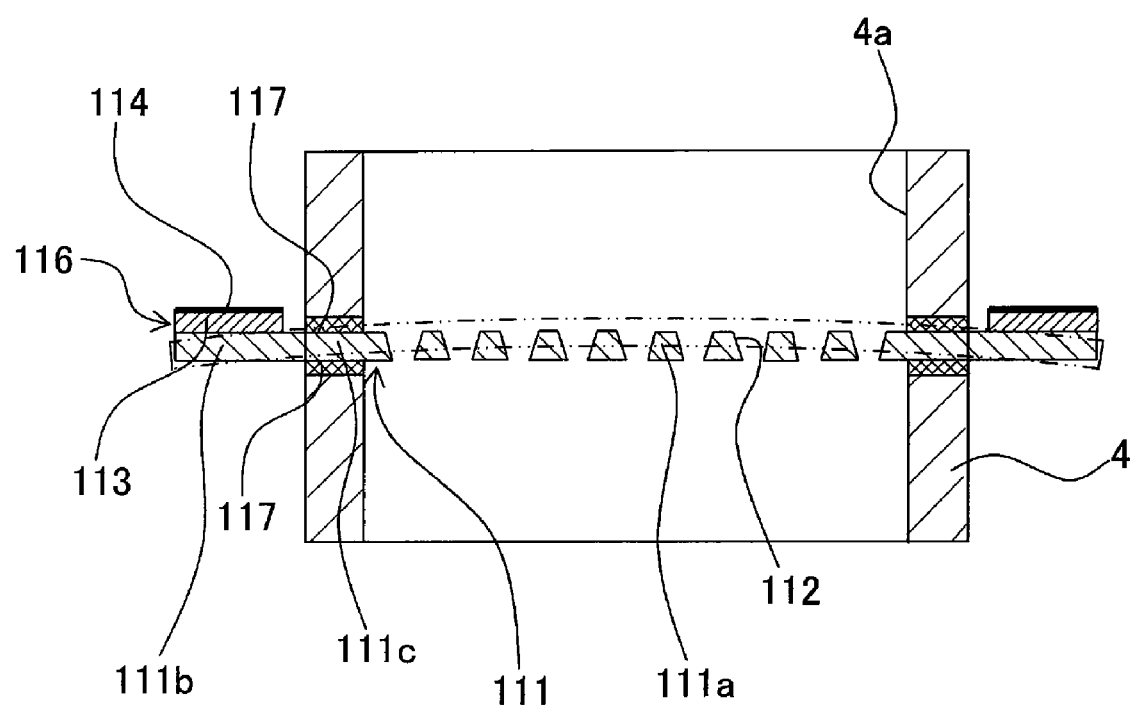
FIG. 15 is a cross-sectional view corresponding to FIG. 3, of a fifth modified embodiment.

Moreover, in a fifth modified embodiment, as shown in FIGS. 14 and 15, both surfaces of a filter plate 111 are joined to the tube 4 via an elastic member 117, at a fixed portion 111c (the filter plate 111 is deformably supported by a wall which demarcates the ink channel 4a), and almost an entire area of a portion of the filter plate 111, surrounded by the fixed portion 111c has become a through holes formation portion 111a, a plurality of through holes 112 is formed almost over an entire area of the through holes formation portion 111a. Moreover, a piezoelectric layer arrangement portion 111b is provided, at an outer side of the fixed portion 111c, in a first portion of the filter plate 111 to surround the fixed portion 111c, the first portion being extended up to an outer side of the tube 4 crossing over the tube 4. A piezoelectric layer 113 is arranged on an upper surface of the piezoelectric layer arrangement portion 111b, to surround the fixed portion 111c. An electrode 114 is formed on an upper surface of the piezoelectric layer 113. In this case, a piezoelectric actuator 116 is formed by a portion of the filter plate 111 overlapping with the piezoelectric layer 113, the piezoelectric layer 113, and the electrode 114.

In this case, the filter plate 111 is joined to the tube 4 via the elastic member 117, at the fixed portion 111c, and is deformable in the fixed portion 111c. When an electric potential of the electrode 114 is changed similarly as in the embodiment, the filter plate 111 including the fixed portion 111c and the through holes formation portion 111a vibrates as a whole. Accordingly, the air bubbles adhered to the through holes 112 are separated assuredly from the through holes 112.

Moreover, in this case, since the piezoelectric layer 113 and the electrode 114 are positioned on the outer side of the tube 4, and the ink inside the ink channel 4a does not adhere to the piezoelectric layer 113 and the electrode 114, a protective layer as in the embodiment has not been formed. Moreover, since the piezoelectric layer 113 is not arranged at an interior of the ink channel 4a in the filter plate 111, it is possible to form the through holes 112 of that much amount (equivalent to that portion), and the life of the filter becomes even longer.

Figure 16:
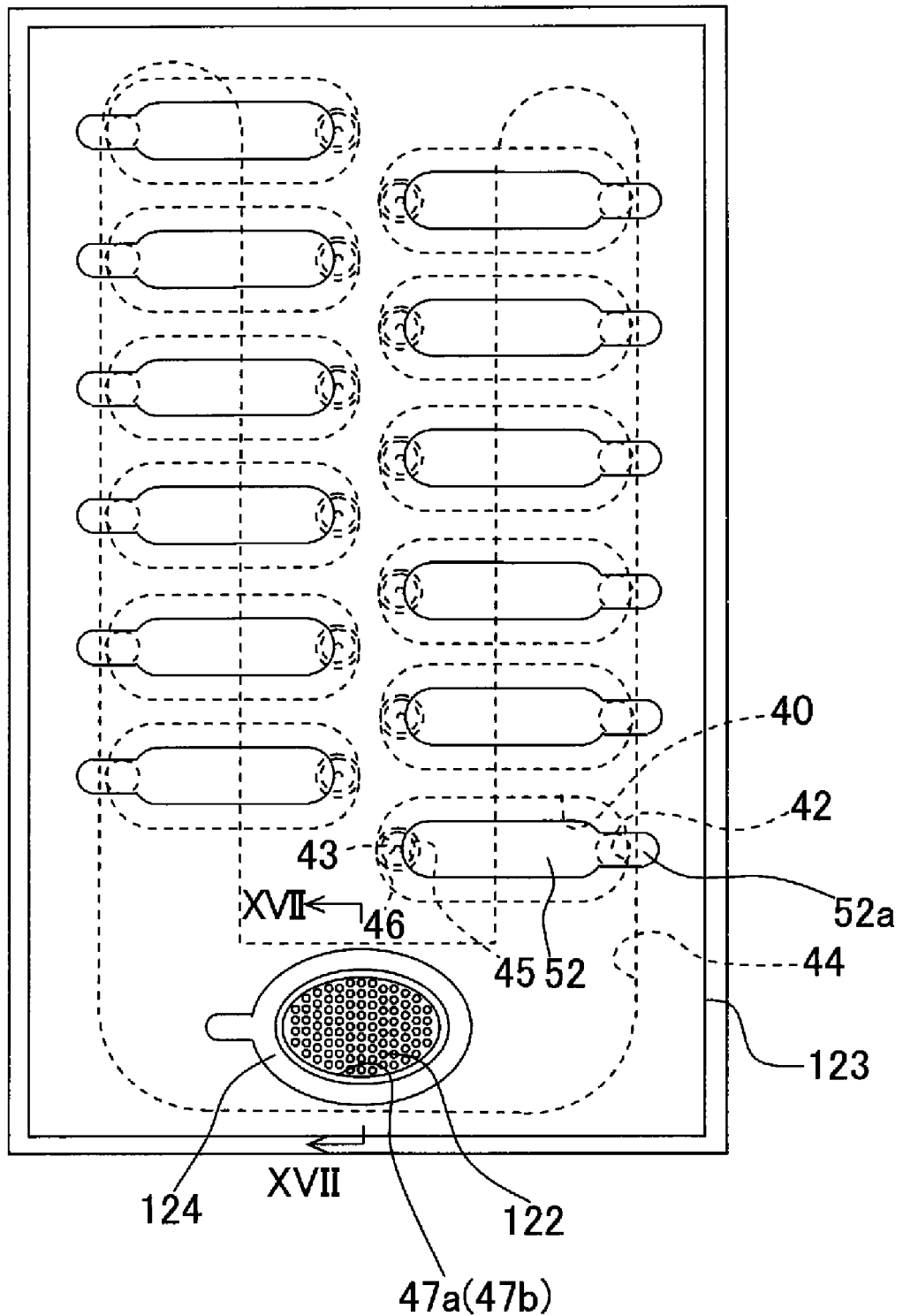
FIG. 16 is a plan view corresponding to FIG. 4, of a sixth modified embodiment.
Figure 17:
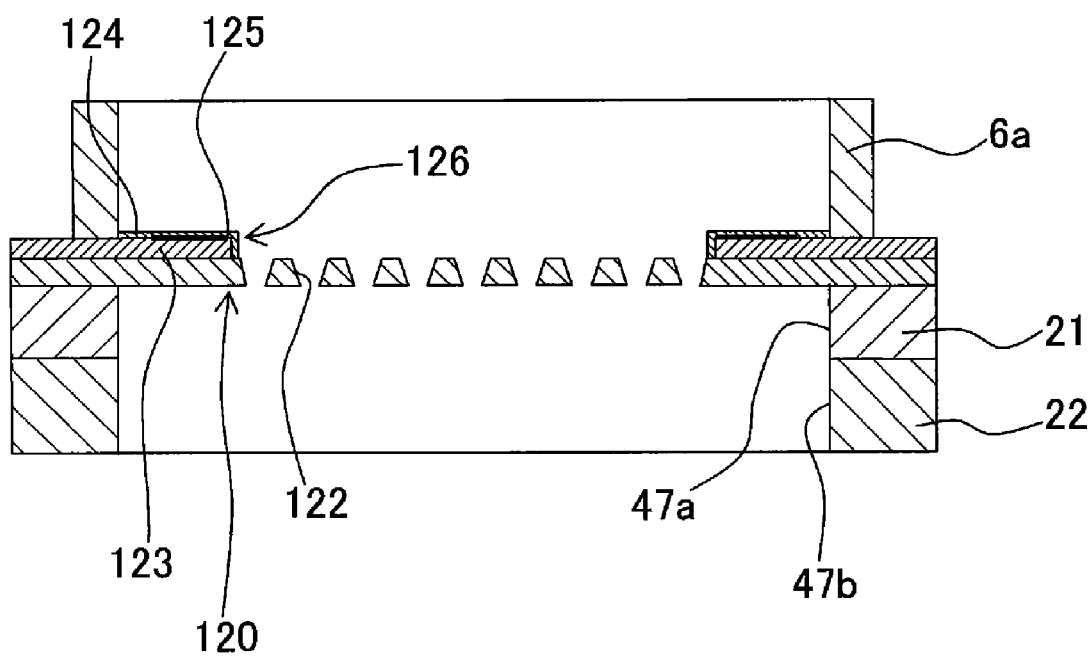
FIG. 17 is a cross-sectional view taken along a line XVII-XVII in FIG. 16.

Moreover, the filter is not restricted to be provided at the middle of the tube 4, and may be arranged at any portion of the ink channel supplying the ink from the ink tank 2 to the ink jet head 8. As an example thereof, in a sixth embodiment, as shown in FIGS. 16 and 17, a vibration plate 120 is arranged to cover openings of the pressure chambers 40 in the upper surface of the cavity plate 21 and another openings of the through holes 47a in the upper surface of the cavity plate 21 (openings of the common ink chamber). A plurality of through holes 122 is formed in the vibration plate 120, at portions closing the openings of the through holes 47a in the upper surface of the cavity plate 21. A piezoelectric layer 123 is formed on an upper surface of the vibration plate 120 (on a surface on an opposite side of the channel unit 31), spreading across an entire area excluding an area in which the through holes 122 are formed. A plurality of individual electrodes 52 (first driving electrodes) similar to the electrodes in the embodiment are formed on an upper surface of the piezoelectric layer 123, at positions overlapping with the pressure chambers 40 in a plan view. In addition to this, an electrode 124 (second driving electrode) is formed on the upper surface of the piezoelectric layer 123, in an area surrounding the through holes 122 (near the through holes 122) in a plan view (the individual electrodes 52 and the electrode are formed on the same surface).

A portion of the vibration plate 120, which covers the openings of the pressure chambers 40 corresponds to a pressure chamber covering portion according to the present invention, and a portion of the vibration plate 120, which covers the openings of the through holes 47a corresponds to a filter portion according to the present invention. Moreover, a portion of the piezoelectric layer 123, which overlaps with the pressure chambers 40 in a plan view corresponds to a plurality of first piezoelectric elements according to the present invention, and a portion of the piezoelectric layer 123, which is sandwiched between the vibration plate 120 and the electrode 124 corresponds to a second piezoelectric element according to the present invention. Further, a portion of the vibration plate 120 which covers the through holes 47a, a portion of the piezoelectric layer 123 which is sandwiched between the vibration plate 120 and the electrode 124, and the electrode 124 correspond to a filter according to the present invention.

In this case, the vibration plate 120 is kept at the ground electric potential by one drive IC which is not shown in the diagram, and the driving electric potential is applied to each of the individual electrode 52 and the electrode 124 by this driver IC. Moreover, it is possible to make the ink jet from the nozzle 46 similarly as in the embodiment by applying the driving electric potential to the individual electrode 52. At this time, the ink, which has passed through the through holes 122 formed in the vibration plate 122, is supplied to the manifold channel 44, but at this time, the air bubbles and impurities which cannot pass through the through holes 122 are trapped in the through holes 122. Therefore, the air bubbles and impurities hardly flow inside an individual ink channel ranging from the exit ports of the manifold channel 44 and the manifold channel 44 up to the nozzle 46 via the pressure chamber 40, and it is possible to prevent the jetting characteristics of the ink from the nozzle 46 from being changed (fluctuated) due to the impurities and the air bubbles.

On the other hand, it is possible to make vibrate the portion of the vibration plate 120 in which the through holes 122 are formed by changing the electric potential of the electrode 124 similarly as the electric potential of the electrode 14 in the embodiment (refer to FIG. 3). Accordingly, the air bubbles adhered to the through holes 122 are separated from the through holes 122. Consequently, similarly as in the embodiment, the air bubbles adhered to the through holes 122 are discharged assuredly to an outside along with the ink inside the ink-jet head by making vibrate the portion of the vibration plate 120 in which the through holes 122 are formed at the time of carrying out purge. Consequently, the blocking of the through holes 122 due to the air bubbles is eliminated, and it is possible to let the filter have a long life.

Moreover, in this case, since the vibration plate 120 also serves as a filter plate which forms the filter, a separate filter plate is not required for forming the filter, and a structure of the entire printer is simplified. Furthermore, it is possible to form a piezoelectric actuator for making jet the ink from the nozzles 46, and a piezoelectric actuator 126 for making vibrate the vibration plate (filter plate) 120 simultaneously. That is, it is possible to form the piezoelectric layer 123 on the upper surface of the vibration plate 120 at one time (to form the first piezoelectric elements and the second piezoelectric element) and also to form the electrode 124 and the individual electrodes 52 on the upper surface of the piezoelectric layer 123 at one time. Therefore, a manufacturing process of the printer is simplified.

In the abovementioned description, the filter plate (vibration plate) has been serving as one electrode for driving the piezoelectric actuator. However, without restricting to this, an electrode may be provided separately from the filter plate (vibration plate), such as by forming an insulating film on an upper surface of the filter plate (vibration plate) made of a metallic material, and forming an electrode on an upper surface of the insulating film.

Moreover, in the embodiment described above, the purge was carried out by sucking out the ink inside the ink-jet head 8 by lowering (reducing) the pressure inside the space surrounded by the purge cap 10a and the lower surface of the ink-jet head 8, by the suction pump 10b. However, without the suction pump 10b provided to the purge unit 10, and the purge cap 10a brought in a close contact with the lower surface of the ink-jet head 8, the purge may be carried out by discharging the ink to the purge cap 10a from the nozzle 46 by increasing the pressure of the ink inside the ink channel by the pump 3. In this case, the pump 3 and the purge unit 10 correspond to a liquid discharge mechanism and a flow-generator according to the present invention. The flow-generator may be arbitrary mechanism as long as the mechanism can generate a flow in the liquid. For example, a pump, a screw propeller can be used as the flow-generator.

Figure 18:
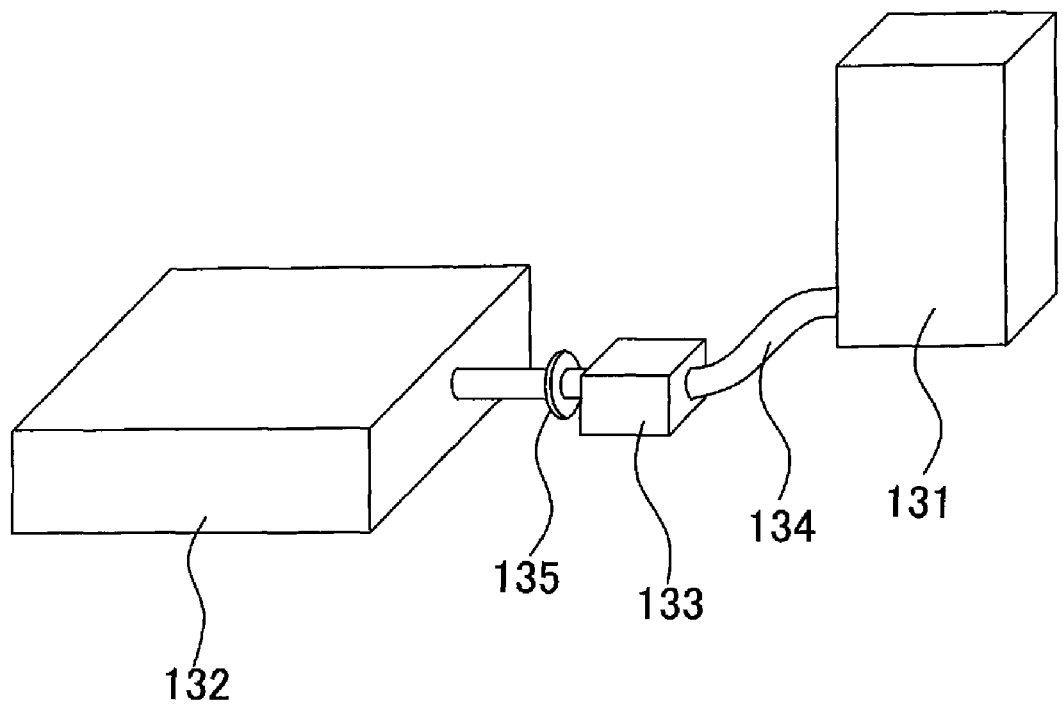
FIG. 18 is a diagram showing an example in which, a filter according to the present invention is arranged in a tube, which supplies a fuel inside a fuel cartridge, to a fuel cell (fuel battery).

Moreover, in the abovementioned description, the filter was provided to the ink channel, which supplies the ink to the ink-jet head. However, without restricting to this, it is also possible to provide the filter to a liquid channel, which supplies a liquid other than ink. For example, as shown in FIG. 18, a fuel cell 132 and a fuel cartridge 131 in which a liquid which is a fuel has been filled may be connected, and a filter 135 may be provided in a tube 134 (liquid channel) which supplies the liquid which is a fuel, from the fuel cartridge 131 to the fuel cell 132 by a pump 133. Moreover, it is also possible to apply to a micro chemical analysis system (µ-TAS) etc.

What is claimed is:

1. A liquid transporting apparatus which transports a liquid, comprising:
   a filter which is arranged in a liquid channel through which a liquid flows, comprising:
      a filter plate in which a plurality of through holes communicating with the liquid channel is formed; and
      a piezoelectric actuator which vibrates the filter plate, and which has a piezoelectric layer formed on a surface of the filter plate, and an electrode provided on a surface of the piezoelectric layer,
   a liquid channel in which the filter is arranged;
   a flow-generator which generates a flow of the liquid in the liquid channel; and
   a controller which controls an operation of the piezoelectric actuator and the flow-generator,
   wherein, when the controller controls the piezoelectric actuator to vibrate the filter plate, the controller controls the flow-generator to generate the flow of the liquid in the liquid channel, so that a period during which the piezoelectric actuator vibrates the filter plate is less than a period during which the flow-generator generates the flow of the liquid in the liquid channel.

2. The liquid transporting apparatus according to claim 1, wherein the filter plate has a ring-shaped fixed portion which is fixed to a wall defining the liquid channel; a first area surrounded by the fixed portion; a through holes-formation portion in which the through holes are formed; and a piezoelectric layer-arrangement portion on which the piezoelectric layer is arranged, and
   the through holes-formation portion and the piezoelectric layer-arrangement portion are provided in the first area of the filter plate such that these portions do not overlap mutually.

3. The liquid transporting apparatus according to claim 2, wherein the through holes-formation portion is provided substantially at a center of the first area, and the piezoelectric layer-arrangement portion is provided to surround the through holes-formation portion.

4. The liquid transporting apparatus according to claim 2, wherein the through holes-formation portion is provided on an outer portion of the first area, and the piezoelectric layer-arrangement portion is provided at an inner portion, of the filter plate, located with respect to the through holes-formation portion.

5. The liquid transporting apparatus according to claim 1, wherein a protective film which covers the piezoelectric layer and the electrode is provided on one surface of the filter plate.

6. The liquid transporting apparatus according to claim 1, wherein the protective film covers the piezoelectric actuator and an adjacent portion, of a certain member, adjacent to the piezoelectric actuator, the member being arranged adjacent to the piezoelectric actuator.

7. The liquid transporting apparatus according to claim 2, wherein an adjacent portion, of a side surface of the piezoelectric layer, adjacent to the through holes-formation portion is progressively inclined to be nearer to the through holes-formation portion toward the one surface of the filter plate.

8. The liquid transporting apparatus according to claim 1, wherein
   the filter plate is extended up to a portion outside of the liquid channels upon beyond a wall defining the liquid channel, and is deformably supported by the wall defining the liquid channel; and
   the piezoelectric layer is arranged on an area of the filter plate, the area being outside of the wall defining the liquid channel.

9. The liquid transporting apparatus according to claim 1, wherein
   the electrode is provided on a surface of the piezoelectric layer, on a side not facing the filter plate;
   the filter plate is made of an electroconductive material; and
   an electric field is applied, by the electrode and the filter plate, to a portion of the piezoelectric layer sandwiched between the electrode and the filter plate.

10. The liquid transporting apparatus according to claim 1, wherein the through holes formed in the filter plate are formed to be tapered from the one surface of the filter plate toward another surface of the filter plate opposite to the one surface.

11. A liquid jetting apparatus which jets a liquid, comprising:
   a liquid transporting apparatus as defined in claim 1;
   a liquid channel in which the filter is arranged;
   a liquid jetting head which has a nozzle communicating with the liquid channel and which jets the liquid from the nozzle;
   a liquid discharge mechanism which discharges the liquid inside the liquid channel and the liquid jetting head through the nozzle; and
   a controller which controls an operation of the piezoelectric actuator and the liquid discharge mechanism,
   wherein when the liquid discharge mechanism discharges the liquid inside the channel unit through the nozzle, the controller controls the piezoelectric actuator and the liquid discharge mechanism such that the piezoelectric actuator vibrates the filter plate.

12. The liquid jetting apparatus according to claim 11, wherein the controller controls the liquid discharge mechanism discharge the liquid inside the channel unit, and at the same time, controls the piezoelectric actuator to vibrate the filter plate; and a time during which the controller controls the piezoelectric actuator to vibrate the filter plate is not more than half of a time during which the controller controls the liquid discharge mechanism to discharge the liquid.

13. The liquid jetting apparatus according to claim 11, wherein the controller controls the piezoelectric actuator to vibrate the filter plate at a frequency in a range of 20 Hz to 30 Hz.

14. The liquid transporting apparatus according to claim 1, wherein the controller controls the flow-generator to generate the flow of the liquid in the liquid channel, and at the same time, controls the piezoelectric actuator to vibrate the filter plate; and a time during which the controller controls the piezoelectric actuator to vibrate the filter plate is not more than half of a time during which the controller controls the flow-generator to generate the flow of the liquid.

15. The liquid transporting apparatus according to claim 1, wherein the controller controls the piezoelectric actuator to vibrate the filter plate at a frequency in a range of 20 Hz to 30 Hz.

* * * * *